(12) United States Patent
Hujer et al.

(10) Patent No.: US 10,981,621 B2
(45) Date of Patent: Apr. 20, 2021

(54) HYDRAULIC LINE CONNECTION FOR A HYDRAULIC BRAKE FOR HANDLEBAR STEERING AND HANDLEBAR WITH HYDRAULIC BRAKE

(71) Applicant: Gustav Magenwirth GmbH & Co. KG, Bad Urach (DE)

(72) Inventors: Joachim Hujer, Grabenstetten (DE); Jochen Coconcelli, Metzingen (DE); Christian Neutsch, Reutlingen (DE)

(73) Assignee: Gustav Magenwirth GMBH & Co. KG, Bad Urach (DE)

( * ) Notice: Subject to any disclaimer, the term of this patent is extended or adjusted under 35 U.S.C. 154(b) by 161 days.

(21) Appl. No.: 16/030,476

(22) Filed: Jul. 9, 2018

(65) Prior Publication Data

US 2019/0009858 A1    Jan. 10, 2019

(30) Foreign Application Priority Data

Jul. 10, 2017  (DE) .................... 10 2017 211 793.1

(51) Int. Cl.
| | | |
|---|---|---|
| *B62L 3/02* | (2006.01) | |
| *B62K 21/12* | (2006.01) | |
| *B60T 17/04* | (2006.01) | |

(52) U.S. Cl.
CPC ............ *B62L 3/023* (2013.01); *B60T 17/043* (2013.01); *B62K 21/12* (2013.01)

(58) Field of Classification Search
CPC .... B62L 3/023; B62L 3/02; B62L 3/00; B60T 17/043; B60T 17/04
See application file for complete search history.

(56) References Cited

U.S. PATENT DOCUMENTS

| | | |
|---|---|---|
| 4,678,360 A | 7/1987 | Miller |
| 5,417,481 A | 5/1995 | Megerle et al. |
| 5,560,457 A | 10/1996 | Rike |
| 9,120,522 B1 | 9/2015 | Nishino |
| 9,475,541 B2 | 10/2016 | Hujer et al. |
| 9,827,968 B2 | 11/2017 | Bradley et al. |
| 9,878,760 B2 | 1/2018 | Hujer et al. |

(Continued)

FOREIGN PATENT DOCUMENTS

| | | |
|---|---|---|
| CN | 2086819 U | 10/1991 |
| CN | 2293509 Y | 10/1998 |

(Continued)

OTHER PUBLICATIONS

European Search Report for European Patent App. No. 18181182.9 dated Apr. 17, 2019.

(Continued)

*Primary Examiner* — Jacob D Knutson
*Assistant Examiner* — Michael R Stabley
(74) *Attorney, Agent, or Firm* — Gregory L. Mayback; Dickinson Wright PLLC

(57) ABSTRACT

A hydraulic line connection for a hydraulic brake of vehicles with handlebar steering comprises a line-fastening device, which has a fastening portion for fastening the line-fastening device in a support of a hydraulic component of the hydraulic brake and a connecting portion for connection with a hydraulic line, wherein the line-fastening device has an extension, which is attached to the fastening portion on the side opposite to the connecting portion.

13 Claims, 15 Drawing Sheets

(56) References Cited

U.S. PATENT DOCUMENTS

| | | | |
|---|---|---|---|
| 9,890,887 | B2 | 2/2018 | Barthel et al. |
| 2002/0180209 | A1 | 12/2002 | Kariyama et al. |
| 2003/0230340 | A1 | 12/2003 | Anderson et al. |
| 2012/0067038 | A1 | 3/2012 | Becocci |
| 2013/0333994 | A1* | 12/2013 | Jordan ............... B62L 3/02 188/344 |
| 2014/0034428 | A1* | 2/2014 | Kariyama ........... B62L 3/023 188/72.4 |
| 2014/0197629 | A1 | 7/2014 | Barthel et al. |
| 2014/0230934 | A1 | 8/2014 | Chen |
| 2014/0318307 | A1 | 10/2014 | Kariyama et al. |
| 2015/0210347 | A1 | 7/2015 | Chen et al. |
| 2016/0200392 | A1 | 7/2016 | Bradley et al. |
| 2016/0251056 | A1* | 9/2016 | Chen ................... B62L 3/023 188/344 |
| 2016/0339894 | A1 | 11/2016 | Bradley et al. |
| 2018/0056967 | A1 | 3/2018 | Bradley et al. |
| 2018/0180206 | A1 | 6/2018 | Kim et al. |

FOREIGN PATENT DOCUMENTS

| | | |
|---|---|---|
| CN | 202859666 U | 4/2013 |
| CN | 203021143 U | 6/2013 |
| CN | 103925438 A | 7/2014 |
| CN | 104190564 U | 12/2014 |
| CN | 204300587 U | 4/2015 |
| CN | 205078941 U | 3/2016 |
| CN | 105775022 A | 7/2016 |
| CN | 205359914 U | 7/2016 |
| CN | 205469631 U | 8/2016 |
| CN | 103925438 B | 1/2017 |
| CN | 207112173 U | 3/2018 |
| CN | 108240517 A | 7/2018 |
| DE | 1475799 A1 | 3/1969 |
| DE | 60200978 T2 | 1/2005 |
| DE | 60118554 T2 | 4/2007 |
| DE | 102008035135 A1 | 2/2010 |
| DE | 102011085000 B3 | 10/2012 |
| DE | 102013009904 A1 | 12/2013 |
| DE | 102012112067 A1 | 2/2014 |
| DE | 102012112226 A1 | 2/2014 |
| DE | 102013100111 A1 | 2/2014 |
| DE | 102013100141 A1 | 2/2014 |
| DE | 202015102010 U1 | 6/2015 |
| DE | 102016000240 A1 | 7/2016 |
| DE | 102017208982 A1 | 6/2018 |
| EP | 0425766 A1 | 5/1991 |
| EP | 0816694 B1 | 4/2002 |
| EP | 1264764 A2 | 12/2002 |
| EP | 1787899 B1 | 3/2011 |
| EP | 2431647 A2 | 3/2012 |
| EP | 2754941 A2 | 7/2014 |
| EP | 2955072 A1 | 12/2015 |
| EP | 3042836 A1 | 7/2016 |
| EP | 3043102 A1 | 7/2016 |
| EP | 2754941 A3 | 10/2016 |
| EP | 2655949 B1 | 5/2017 |
| GB | 224990 A | 11/1924 |
| GB | 397854 A | 8/1933 |
| GB | 470581 A | 8/1937 |
| GB | 628548 A | 8/1949 |
| GB | 854219 A | 11/1960 |
| GB | 923856 A | 4/1963 |
| GB | 966587 A | 8/1964 |
| GB | 975550 A | 11/1964 |
| GB | 992928 A | 5/1965 |
| GB | 1086957 A | 10/1967 |
| GB | 1188545 A | 4/1970 |
| GB | 1329715 A | 9/1973 |
| GB | 1334903 A | 10/1973 |
| GB | 2017230 A | 10/1979 |
| GB | 2558578 A | 7/2018 |
| JP | 2014137141 A | 7/2014 |
| JP | 2016172019 A | 9/2016 |
| JP | 2018035928 A | 3/2018 |
| KR | 20000025058 A | 5/2000 |
| KR | 20080096486 A | 10/2008 |
| KR | 20140092260 A | 7/2014 |
| KR | 2018076391 A | 7/2018 |
| TW | M494119 U | 1/2015 |
| TW | 201538368 A | 10/2015 |
| TW | M518750 U | 3/2016 |
| TW | 201639746 A | 11/2016 |
| TW | 201812202 A | 4/2018 |
| WO | 03031259 A2 | 4/2003 |
| WO | 2018042904 A1 | 3/2018 |
| WO | 2018127495 A1 | 7/2018 |

OTHER PUBLICATIONS

European Search Report for European Patent App. No. 18181182.9 dated Jan. 4, 2019.
Trickstuff GmbH "Inner installation of the brake line of hydraulic brakes" [online], May 2016 [retrieved on Jul. 5, 2018]. retrieved from the Internet:<http://www.trickstuff.de/de/manuals/PDFs/160510_BremsleitungimRahmenverlegen_CK_KL.pdf>, p. 1.

* cited by examiner

HYDRAULIC LINE CONNECTION FOR A HYDRAULIC BRAKE FOR HANDLEBAR STEERING AND HANDLEBAR WITH HYDRAULIC BRAKE

CROSS-REFERENCE TO RELATED APPLICATIONS

This application claims the priority, under 35 U.S.C. §§ 119, 120, 172, 363, 365, and 371, of German patent application No. 10 2017 211 793.1, filed Jul. 10, 2017; the prior application is herewith incorporated by reference in its entirety.

STATEMENT REGARDING FEDERALLY SPONSORED RESEARCH OR DEVELOPMENT

Not Applicable

FIELD OF THE INVENTION

The invention relates to a hydraulic line connection for a hydraulic brake of vehicles with handlebar steering, in particular for a hydraulic bicycle brake, furthermore in particular for a hydraulic caliper brake as well as a handlebar arrangement for a vehicle with handlebar steering, in particular with a master device for a hydraulic brake, in particular for a hydraulic caliper brake, and hydraulic brake for a vehicle with handlebar steering, in particular for a bicycle.

BACKGROUND OF THE INVENTION

Hydraulic brakes of vehicles with handlebar steering usually have a master cylinder which is mounted on a handlebar and to which a hydraulic line is coupled, said line leading to a slave cylinder which is, e.g., a brake cylinder (pair) of a hydraulic (bicycle) caliper brake or a brake caliper of a hydraulic (bicycle or motorbike) disk brake.

It is common practice to deliver such hydraulic brakes to the original equipment manufacturer or final customer in a prefilled state so that the manufacturer can safely and reliably carry out the complex filling and bleeding of the hydraulic brake with his experience. The hydraulic line is installed on the outside or inside to mount it on the vehicle with handlebar steering.

If the hydraulic line is not to be installed on the outside of the vehicle but on the inside, i.e., at least in part within the frame and/or the handlebar, it is necessary to separate the master device and/or the slave device of the hydraulic brake from the hydraulic line and/or to separate the hydraulic line. As a result, the hydraulic line can be installed at the desired locations on the inside.

So that the hydraulic brake can still be delivered to the customer (e.g., original equipment manufacturer or shop or final customer) in a prefilled fashion, it is known from German Published, Non-Prosecuted Patent Application DE 10 2011 085 000 A1 to deliver the hydraulic brake in two parts and to seal the points of separation, i.e., the hydraulic connection of the hydraulic component, from which the hydraulic line was removed after filling the hydraulic brake, and to seal the open side of the hydraulic line. In order to remove the seal, the mounted and connected brake has to be actuated so as to tear apart the sealing element which remains in the line.

The known hydraulic connection devices provide a possibility of delivering prefilled hydraulic components separately from the hydraulic line, such that the line can be installed on the inside and the system can be reassembled. However, the drawback is that the seal is not fully removed and, therefore, defects in the operation might result, e.g., when remainders of the detached sealing measures tear off and interfere with the actuation.

Thus, a need exists to overcome the problems with the prior art systems, designs, and processes as discussed above.

SUMMARY OF THE INVENTION

The disclosed systems and devices provide a hydraulic connection device that allows a separate delivery of prefilled hydraulic systems for vehicles with handlebar steering and simultaneously ensures a simple assembly and a safe operation.

With the foregoing and other objects in view, there is provided, a hydraulic line connection for a hydraulic brake of vehicles with handlebar steering, comprising a line-fastening device which has a fastening portion for fastening the line-fastening device in a support of a hydraulic component of the hydraulic brake and a connecting portion for connection with a hydraulic line, wherein the line-fastening device has an extension which is attached to the fastening portion on the side opposite to the connecting portion.

The embodiment has the advantage that, after the filling, the extension can serve as a seal and can be removed for assembly. It is thus possible to fill the hydraulic line and safely close it with the extension. For the purpose of assembly, the extension can easily be separated from the line-fastening device, such that the fastening portion can be easily and safely arranged and secured in the support of the hydraulic component. Since the extension can be removed before the assembly, there is no risk that the actuation can be impaired by remainders of a seal.

In accordance with another feature, the line-fastening device can have a separator which is arranged between the fastening portion and the extension.

This embodiment has the advantage that the extension can be removed more easily and readily from the fastening portion.

In accordance with a further feature, the separator can be designed as a predetermined breaking point. For example, the separator can be designed as a circumferential groove, along which the extension can be separated under the impact of, e.g., a tool or a special tool.

In accordance with an added feature, a seal can be arranged in the extension.

The provision of a seal in the extension has the advantage that the line-fastening device can be attached to the hydraulic line and then the hydraulic line can be filled with hydraulic fluid through the extension. Then, the extension can be closed with the seal. The seal can be, e.g., a ball which is pressed into the extension by a press fit. Other seal known to a person skilled in the art are conceivable. It should here be noted that the seal does not have to withstand the full pressure which can be built up in the hydraulic line during braking because the seal only needs to fulfill the function of a transport securing device and is removed together with the extension when the line-fastener is mounted on the support of the hydraulic component. Alternatively, the extension can also be designed in closed fashion. With respect to the preferred embodiment, the drawback is that the hydraulic line has to be prefilled before the line-fastening device is attached to the hydraulic line.

In accordance with an additional feature, the extension can have a cross-section different from that of the fastening portion.

The advantage of this embodiment is that the operator is prevented from arranging by mistake the line-fastening device to the extension in the support of the hydraulic component before the extension is cut off. This is the case because the cross-section of the fastening portion is matched precisely with the free cross-section of the support. The extension will not fit into the support through the other cross-section.

In accordance with yet another feature, the extension can have a larger diameter than the fastening portion.

This embodiment has the advantage that the extension cannot be inserted into the support of the hydraulic component at all because the inside diameter thereof precisely matches the outside diameter of the fastening portion. Alternatively or additionally, the outer contour of the extension can also have a shape other than the inside diameter of the support of the hydraulic component. For example, the outer contour of the extension can be polygonal while the support has a circular inner contour. Likewise, the outer contour of the extension can be polygonal while the inner contour of the support can be circular, the diameter of the circular contour being, e.g., smaller than the outer circle of the polygonal contour.

In accordance with yet a further feature, the extension can have a diameter that is at least 5%, particularly at least 10%, more particularly at least 15%, and in particular at least about 20% larger than that of the fastening portion.

In accordance with yet an added feature, the extension can have a diameter which is less than 50%, particularly less than 40%, more particularly less than 30% and in particular about 20% larger than that of the fastening portion.

For example, the extension can have a diameter of 6 mm while the fastening portion has a diameter of 5 mm.

In accordance with yet an additional feature, the extension can have a larger cross-section than that of the fastening portion, which leads to the above-described advantages that the extension cannot be arranged by mistake in the support of the hydraulic component.

In accordance with again another feature, the extension can have a cross-section that is at least 10%, particularly at least 20%, more particularly at least 30%, even more particularly at least 40% and in particular about 50% larger than that of the fastening portion.

In accordance with again a further feature, the extension can have a cross-section that is less than 100%, particularly less than 80%, more particularly less than 70%, even more particularly less than 60% and in particular about 50% larger than that of the fastening portion.

With the objects in view, there is also provided a hydraulic line connection device and hydraulic component-fastening device for a hydraulic actuation device of vehicles with handlebar steering.

In the case of vehicles with handlebar steering, it is desirable to install, if possible, all lines inside the handlebar and the frame or the fork to avoid damage. This applies, in particular, to the hydraulic lines of hydraulic actuation systems, such as brakes, couplings and other hydraulic actuation systems, such as gearshifts, etc.

In the case of the master devices arranged on the handlebar, the lines are known to be guided out of the master device and through a hole in the handlebar pipe into the handlebar, such that the hydraulic line can be installed inside the handlebar and, where appropriate, also further in the frame or the fork.

These embodiments have a drawback that the hole in the handlebar pipe has to be adapted to the position of the master device and a subsequent adjustment of the position of the master device is no longer easily possible without bending the hydraulic line.

Therefore, also provided is a hydraulic line connection device and hydraulic component fastening device for a hydraulic actuation device of vehicles with handlebar steering, in which the hydraulic line can be installed inside and simultaneously the position of the hydraulic component can be adapted to the needs in optimum fashion.

With the objects in view, there is also provided a hydraulic line connection device and hydraulic component fastening device for a hydraulic actuation device of vehicles having handlebar steering, comprising a hydraulic line connector which can be arranged in a handlebar, a fork leg and/or frame part of the vehicle with handlebar steering, a hydraulic component fastener which has a support for receiving the hydraulic component and a hydraulic connector which connects the hydraulic line connector to the hydraulic component fastener, the support having a connecting channel which can be connected to the pressure chamber of the hydraulic component.

This embodiment has the advantage that the hydraulic line can be installed fully inside. Particularly advantageous is the combination with the hydraulic line connection according to the above described embodiment which can be provided, e.g., at the end of the hydraulic line in order to be connected to the corresponding hydraulic component. In this case, the embodiment can be delivered as a complete handlebar arrangement as original equipment with prefilled hydraulic components. The connecting channel can extend in the circumferential direction in relation to the handlebar pipe. Alternatively or additionally, the connecting channel that extends in the circumferential direction in relation to the handlebar pipe can also be formed in the hydraulic component or the area of the hydraulic component that is opposite the hydraulic component-fastening device or by which the hydraulic component is mounted on the hydraulic component-fastening device.

In accordance with again a further feature, the connecting channel can extend in the circumferential direction in relation to the handlebar pipe over an angular range of more than 20 degrees.

In accordance with again an added feature, the connecting channel can extend in the circumferential direction in relation to the handlebar pipe over an angular range of more than 30 degrees.

In accordance with again an additional feature, the connecting channel can extend in the circumferential direction in relation to the handlebar pipe over an angular range of more than 40 degrees.

In accordance with still another feature, the connecting channel can extend in the circumferential direction in relation to the handlebar pipe over an angular range of less than 180 degrees.

In accordance with still a further feature, the connecting channel can extend in the circumferential direction in relation to the handlebar pipe over an angular range of less than 150 degrees.

In accordance with still an added feature, the connecting channel can extend in the circumferential direction in relation to the handlebar pipe over an angular range of less than 120 degrees.

In accordance with still an additional feature, the connecting channel can extend in the circumferential direction in relation to the handlebar pipe over an angular range of less than 90 degrees.

In accordance with another feature, the connecting channel can extend in the circumferential direction in relation to the handlebar pipe over an angular range of less than 70 degrees.

In accordance with a further feature, the connecting channel can extend in the circumferential direction in relation to the handlebar pipe over an angular range of less than 50 degrees.

In accordance with an added feature, the connecting channel can be sealed via radially acting seals. The radially acting seals can here be arranged in grooves that are formed on the support device. The radially acting seals can be applied via a press fit between the hydraulic component and the support device. Alternatively or additionally, the grooves serving to accommodate the seal rings can be provided in the housing of the hydraulic component.

In accordance with an additional feature, the connecting channel can be sealed via axially acting seals. The axially acting seals can here be made as squeezing rings that are squeezed between the support and the hydraulic component. The squeezing pressure can here be applied via a clamp ring that is screwed onto the hydraulic component, and, on the side opposite the squeezing ring, the hydraulic component can, via a stop, abut against the other squeezing ring, which can be supported on the support.

With the objects in view, there is also provided a handlebar arrangement for vehicles with handlebar steering, which also has a hydraulic line connecting device and hydraulic component fastening device for a hydraulic actuation device of vehicles with handlebar steering according to one of the above described embodiments of the invention.

With the objects in view, there is also provided a hydraulic brake and hydraulic disk brake and hydraulic caliper brake with a hydraulic line connection for vehicles with handlebar steering according to one of the above described embodiments of the invention.

With the objects in view, there is also provided a hydraulic brake and/or hydraulic disk brake and/or hydraulic caliper brake with a hydraulic line connection device and hydraulic component fastening device according to one of the above described embodiments of the invention.

With the objects in view, there is also provided a hydraulic brake and/or hydraulic disk brake and/or hydraulic caliper brake with a handlebar arrangement according to one of the above described embodiments of the invention.

The features are described below by embodiments shown in the drawings. The following reference signs are used.

1 hydraulic line
2 hydraulic component (adapter, master device, slave device)
3 handlebar pipe
4 handle pipe
5 master housing
6 brake lever
7 handlebar stem
8 recess
10 hydraulic line connector
11 hydraulic line connection
12 connecting channel
20 hydraulic connector
21 connecting channel
22 bolt
23 seal
30 hydraulic component fastener
31 recess
32 safety means
33 connecting channel
34 ring support
35 seal
36 seal
37 stop
38 seal
39 external thread
40 fastening arrangement
41 bolt
42 conical ring
43 conical ring
44 conical surface
51 connecting channel
52 pressure chamber
53 equalizing tank
54 fastening portion
55 stop
56 external thread
60 clamp ring
61 internal thread
100 line-fastening device (support sleeve)
110 extension (seal head)
111 inner wall
112 chamfer
113 outer wall
114 seal
120 separator (predetermined breaking point, notch)
130 fastening portion
133 outer wall
140 connecting portion (connecting piece)
200 support (retaining screw)
201 inner wall
210 clamp (clamp ring)
300 sealing device (plug)
301 handle portion
302 shaft portion
303 transitional portion
304 conical portion
$D_A$ external diameter of the extension of the line-fastening device
$D_I$ internal diameter of the support Although the systems, apparatuses, and methods are illustrated and described herein as embodied in a hydraulic line connection for a hydraulic brake of vehicles with handlebar steering, in particular for a hydraulic bicycle brake, furthermore in particular for a hydraulic caliper brake as well as a handlebar arrangement for a vehicle with handlebar steering, in particular with a master device for a hydraulic brake, in particular for a hydraulic caliper brake, and hydraulic brake for a vehicle with handlebar steering, in particular for a bicycle, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which.

DETAILED DESCRIPTION OF THE EMBODIMENTS

Figure 1:
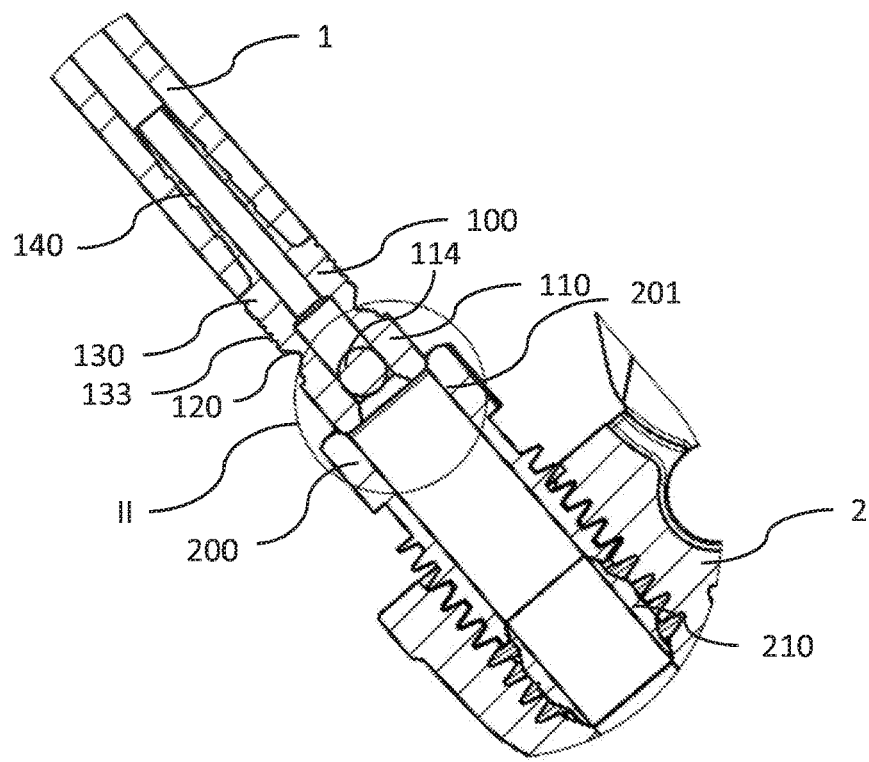
FIG. 1 shows a cross-sectional view through an exemplary embodiment of a hydraulic line connection.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIG. 1, there is shown a first exemplary embodiment of a line-fastening device 100 for fastening a hydraulic line 1 to a hydraulic component 2. The line-fastening device 100 comprises an extension 110, a separator 120, a fastening portion 130, and a connecting portion 140.

The line-fastening device 100 has a passage, the free cross-section of which substantially corresponds to the free cross-section of the hydraulic line 1 to be fastened.

The connecting portion 140 can comprise a first connecting piece that is introduced into the hydraulic line by a press fit in a way known to a person skilled in the art. The surface of the connecting piece comprises a barb-like surface contour that secures the connecting piece adequately against slipping out of the hydraulic line 1 at conventional working pressures.

The fastening portion 130 comprises an outer wall, the outer wall 133 of which is adapted to the surface 201 of an inner wall of a support 200 of the hydraulic component 2, to which the hydraulic line 1 shall be connected. As a rule, the outer wall 133 has the form of a cylinder sleeve, wherein circumferential grooves are provided. Such fastening portions are known to a person skilled in the field of hydraulic line connections, namely from line-fastening devices for fastening lines to hydraulic bicycle caliper brakes and/or hydraulic bicycle disk brakes which, in contrast to here, have no extension but only the fastening portion 130 and the connecting portion 140.

The extension 110 is connected to the fastening portion 130 through a separator 120, which is made as a predetermined breaking point. The separator 120 of the embodiment shown is made as a tapering, groove, or notch. The extension 110 can be separated from the fastening portion 130 with a suitable tool.

The extension 110 also has a passage that is confined by an inner wall 111 of the extension 110. For filling the hydraulic line 1 and/or the hydraulic actuation device, the hydraulic line 1 and the hydraulic component (master/slave) can be filled at its other end through the extension 110. As soon as the system is filled and bled in a way known to a person skilled in the art, the operator can close and hydraulically seal the extension by introducing a seal 114 into the passage. For this purpose, a ball can be pressed into the passage, e.g., as the seal 114, such that the passage is closed by the press fit between ball and the inner wall 111. So that the seal 114 can be introduced more easily into the passage, a chamfer 112 can be provided at the beginning of the passage.

The hydraulic line can comprise a reinforced or non-reinforced hydraulic line. A person skilled in the art knows the areas of use and will select the suitable hydraulic line.

The hydraulic component 2 can be, e.g., a master device or a slave device of a hydraulic brake or coupling and/or another actuation device of a vehicle with handlebar steering. The hydraulic component 2 can also be an adapter that can be, e.g., part of a handlebar arrangement. Likewise, the hydraulic component 2 can be a connecting device for connecting two hydraulic line portions, such as, e.g., a line-coupling device.

The hydraulic component 2 has a hydraulic line connection that is made as a threaded hole. The support 200 is screwed into the threaded hole and can be, e.g., a retaining screw. The support 200 has an inner wall 201, the form of which corresponds to the outer wall 133 of the fastening portion 130 of the line-fastening device 100.

Figure 2:
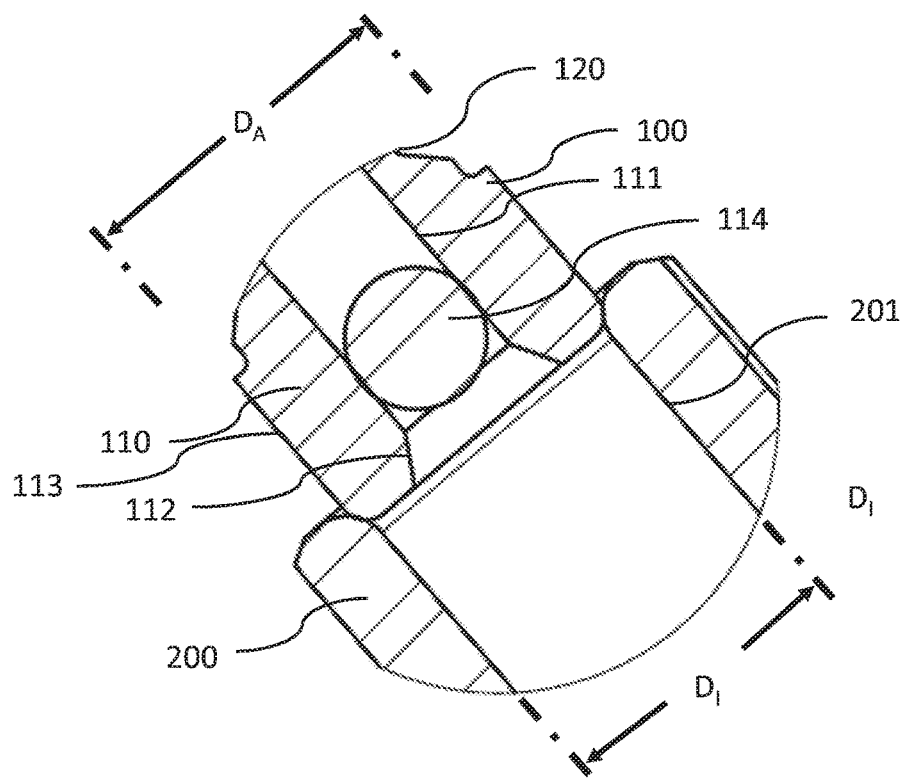
FIG. 2 shows a detailed view of the hydraulic connection of FIG. 1 in the area of the circle denoted by II in FIG. 1.
Figure 3:
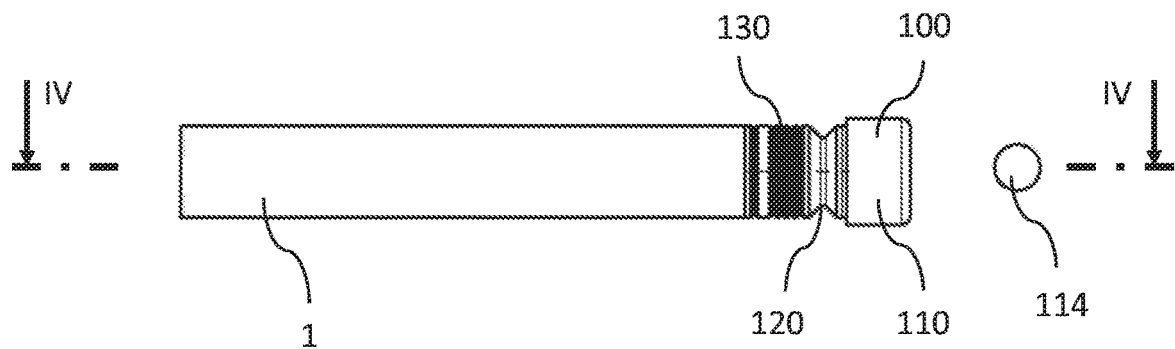
FIG. 3 shows a lateral view of the hydraulic line connection of FIG. 1 in a first step of a fastening to a hydraulic component.
Figure 4:
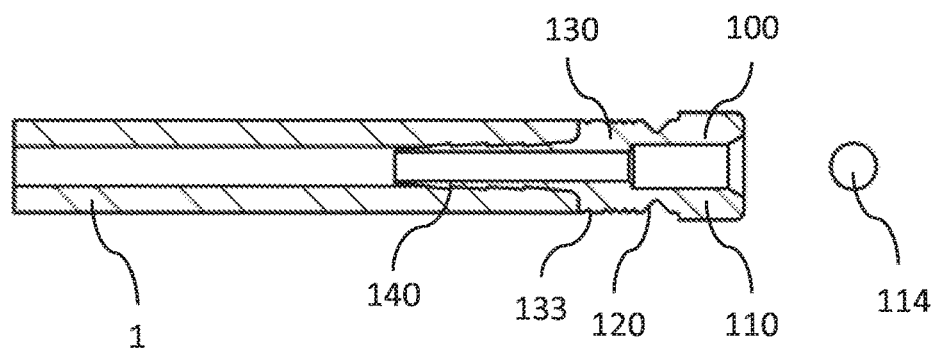
FIG. 4 shows a cross-sectional view of the hydraulic line connection of FIG. 1 along the lines IV-IV of FIG. 3.
Figure 5:
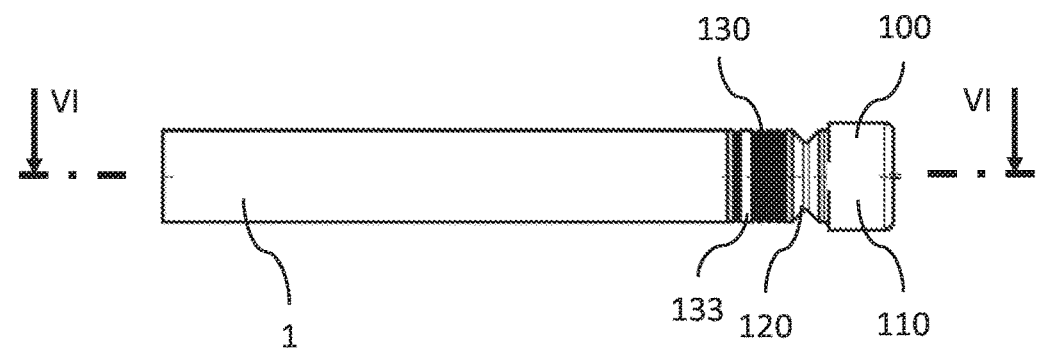
FIG. 5 shows a lateral view of the hydraulic line connection of FIG. 1 in a further step of the fastening to the hydraulic component.
Figure 6:
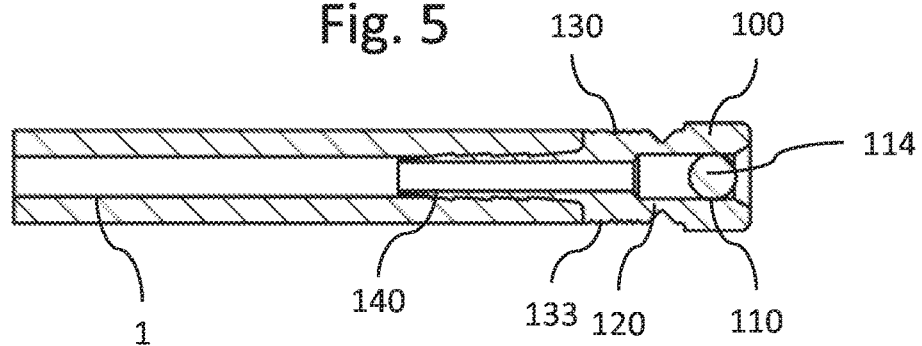
FIG. 6 shows a cross-sectional view of the hydraulic line connection of FIG. 1 along lines VI-VI of FIG. 5.
Figure 7:
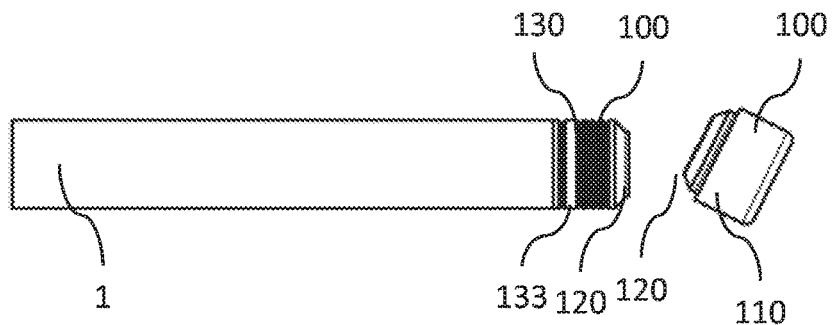
FIG. 7 shows a lateral view of the hydraulic line connection of FIG. 1 in a further step of fastening to the hydraulic component.
Figure 8:
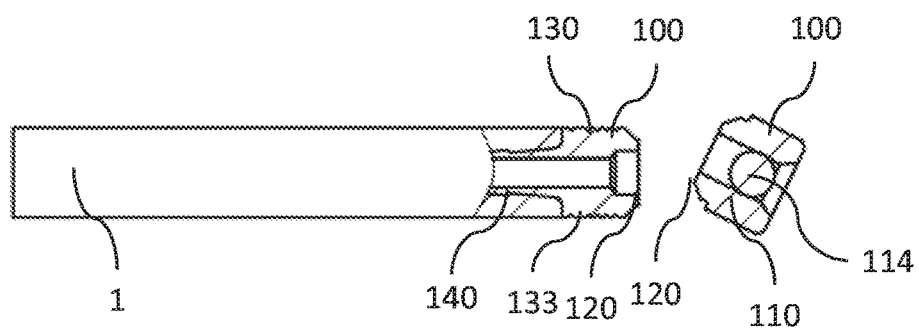
FIG. 8 shows a partial cross-sectional view of the hydraulic line connection of FIG. 1 in the method step corresponding to FIG. 7.
Figure 9:
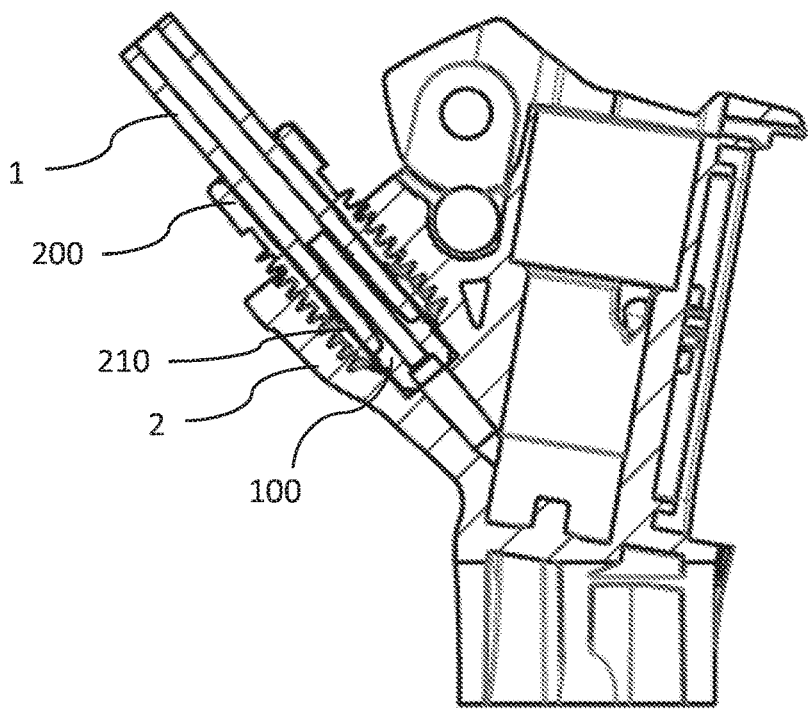
FIG. 9 shows a partial cross-sectional view of a hydraulic component of a hydraulic brake with a connection for connecting the hydraulic line connection of FIG. 1.

The outside diameter $D_A$ of the outer wall 113 of the extension 110 is larger than the internal diameter $D_I$ of the inner wall 201 of the support 200, as shown in FIG. 2. It is thus guaranteed that the line-connecting device 100 cannot be fastened by mistake to the support 200 without the extension 110 being cut off at the separator 120 beforehand, such that the fastening portion 130 can be inserted into the support 200.

To fasten the fastening portion 130 in the support 200, a clamp 210 is initially inserted into the hydraulic connection of the hydraulic component 2. Then, the support 200 is pushed onto the line-fastening device 100, which is already connected to the hydraulic line via the connecting portion 140, which engages in the hydraulic line on the inside. Then, the support 200 is inserted into the hydraulic line connection with the line-fastening device, such that the clamp 210 encloses the fastening portion 130. After that, the support 200 is screwed into the hydraulic line connection such that the clamp 210 is compressed and forms a pressure-tight connection, as shown, e.g., in FIG. 19 by the example of an adapter that is arranged in a handlebar pipe 3.

Figure 10:
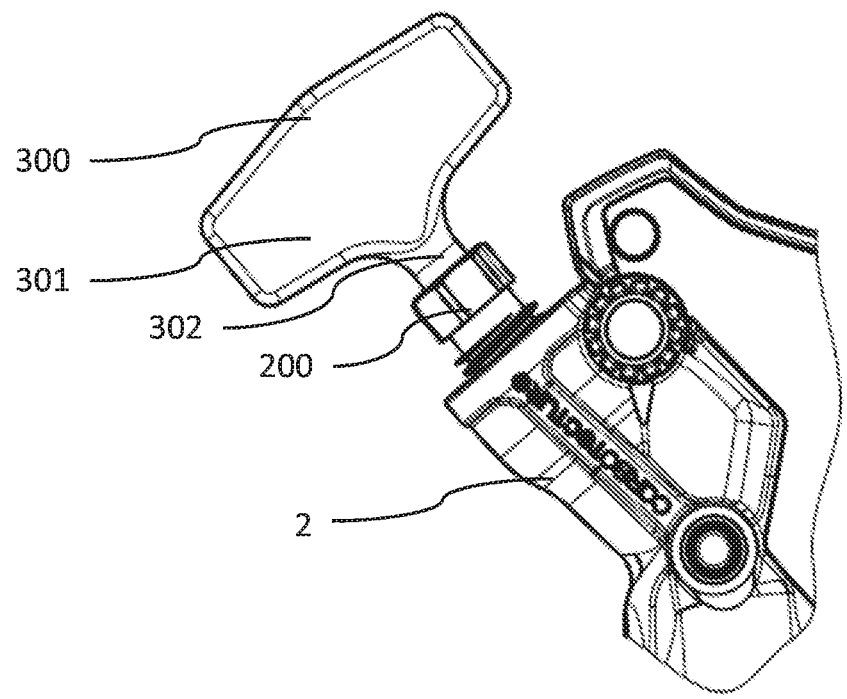
FIG. 10 shows a partial lateral view of the hydraulic component of FIG. 9 with an exemplary embodiment of a sealing device.
Figure 11:
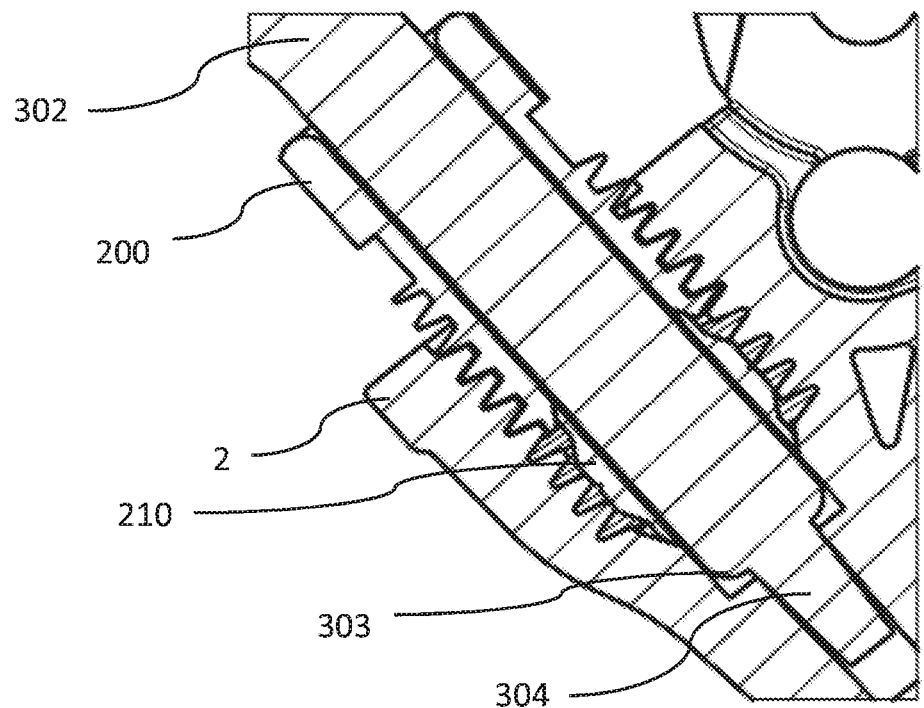
FIG. 11 shows a detailed view of the partial cross-sectional view of the hydraulic component of FIG. 9 with the sealing device.
Figures 12, 13:
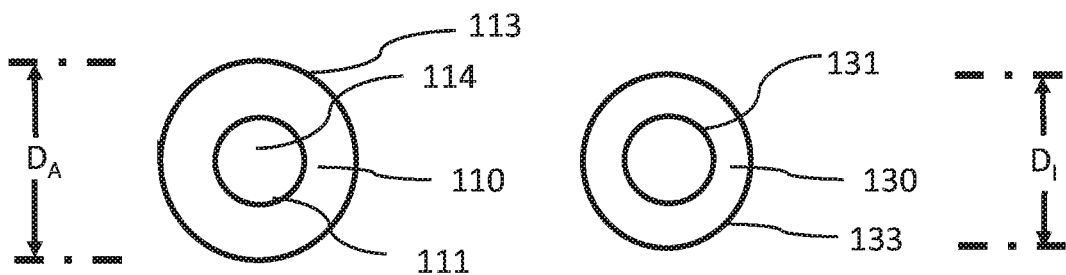
FIG. 12 shows a cross-sectional view through the extension of the line-fastening device of the hydraulic line connection of FIG. 1.
FIG. 13 shows a cross-sectional view through the fastening portion of the line-fastening device of the hydraulic line connection of FIG. 1.

The hydraulic component, to which the hydraulic line connection prefilled with the hydraulic fluid shall be connected via the hydraulic line, also has to be delivered to the user in a prefilled condition so that a complex refilling and venting after the connection is avoided as completely as possible. For this purpose, the hydraulic component is filled with hydraulic fluid and bled in way known to a person skilled in the art. To avoid leakage of hydraulic fluid, the hydraulic component is closed with a sealing device 300 that can be designed as a plug, as shown in FIGS. 10 and 11.

The sealing device 300 has a handle portion 301 that the operator can grip to be able to insert and remove the sealing device 300 into and out of the support 200. In respect of safety, the support 200 can, as with the fastening of the line-fastening device 100 in the support 200, be screwed into the thread of the hydraulic connection, such that the clamp 210 is compressed adequately to ensure safe sealing.

The sealing device 300 has a shaft portion 302, the external diameter of which substantially corresponds to that of the hydraulic line 1 or the line-fastening device 100. A transitional portion 303 connects to the shaft portion 302 and changes into a conical portion 304, which engages in the hydraulic connection in accordance with a Luer cone and produces a sealing effect.

Figures 14, 15:
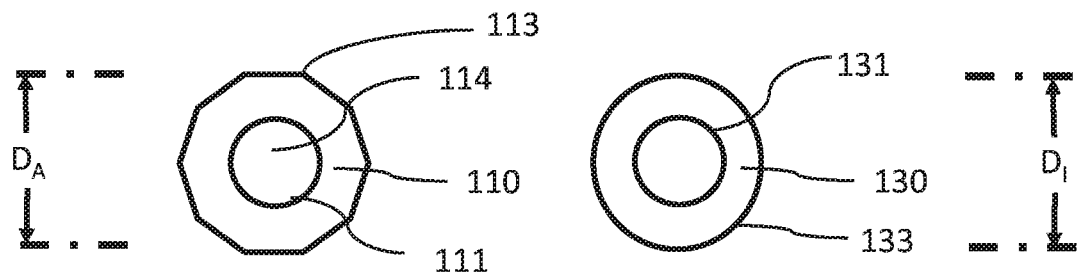
FIG. 14 shows a cross-sectional view corresponding to FIG. 12 through the extension of the line-fastening device of a hydraulic line connection according to a further exemplary embodiment.
FIG. 15 shows a cross-sectional view through the fastening portion of the line-fastening device of the hydraulic line connection of FIG. 14.

FIGS. 14 and 15 show another exemplary embodiment, which corresponds substantially to the embodiment shown in FIGS. 1 to 13 and described in connection thereto. Therefore, only the differences with respect to the embodiment shown and described therein are described below and shown in FIGS. 14 and 15. Apart from that, reference is made to the description and the drawings of the first exemplary embodiment, wherein the same reference signs designate the same or corresponding components or features.

In the embodiment of FIGS. 14 and 15, the fastening portion 130 has an outer wall 133, which is substantially cylindrical. The outer wall 113 of the extension 110 is octagonal in cross-section, but the outer circle thereof has a diameter that is larger than the diameter of the outer wall 133 of the fastening portion 130, which corresponds to the internal diameter $D_I$ of the support 200. Therefore, the distance $D_A$ of the parallel surfaces of the outer wall 113 corresponds to the internal diameter $D_I$ of the support 200. However, the largest dimension corresponds in cross-section to the outer circle of the octagon and is, thus, larger than the internal diameter $D_I$ of the support 200. Therefore, the extension 110 cannot be introduced into the support 200 and the operator will realize that he has to remove the extension 110 with the seal 114 arranged therein from the line-fastening device 100 to be able to then arrange it in the support 200 without the extension 110.

Figures 16, 17:
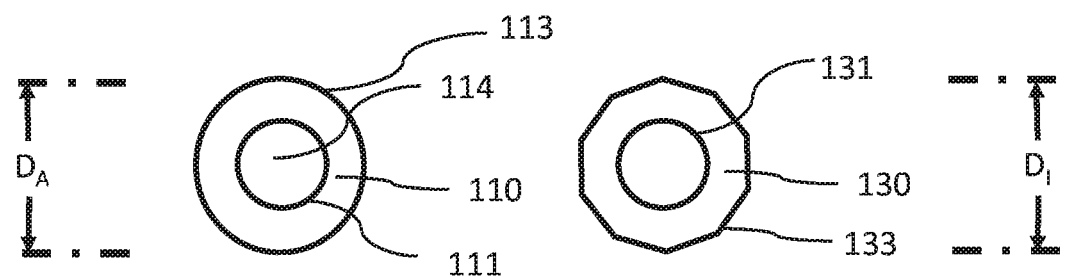
FIG. 16 shows a cross-sectional view corresponding to FIG. 12 through the extension of the line-fastening device of a hydraulic line connection according to a further exemplary embodiment.
FIG. 17 shows a cross-sectional view through the fastening portion of the line-fastening device of the hydraulic line connection of FIG. 16.
Figure 18:
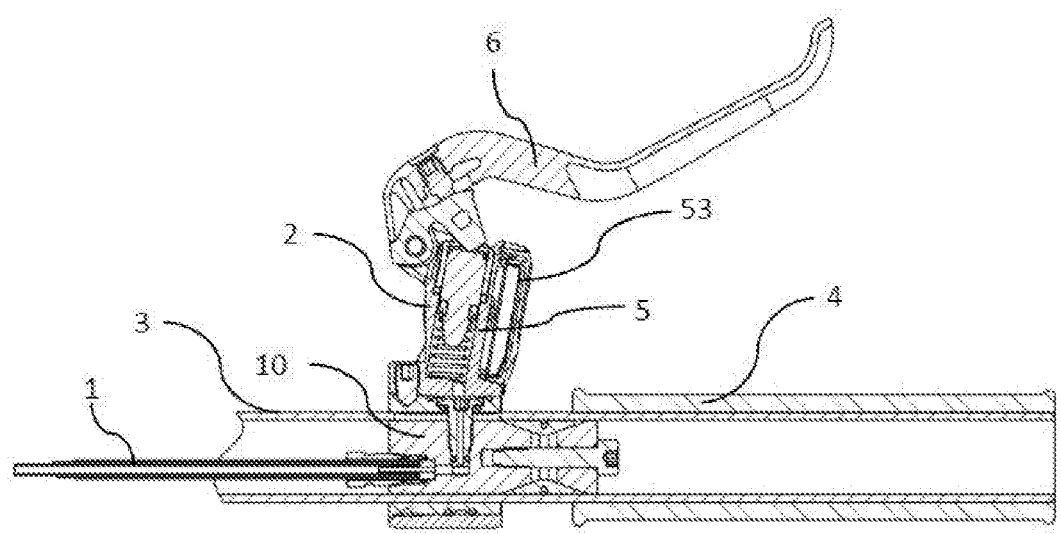
FIG. 18 shows a cross-sectional view of an exemplary embodiment a hydraulic line connection device and hydraulic component fastening device.

FIGS. 16 and 17 show a further exemplary embodiment, which corresponds substantially to the exemplary embodiments shown in FIGS. 1 to 13 or 14 and 15 and described in connection therewith. Therefore, only the differences with respect to the embodiments shown and described therein are described below and shown in FIGS. 16 and 17. Apart from that, reference is made to the description and the drawings of the other embodiments, wherein the same reference signs designate the same or corresponding components or features.

In this embodiment, the support 200 has an inner wall that is octagonal in cross-section. The internal diameter $D_I$ (measured from corner to opposite corner), i.e. the outer circle in cross-section, corresponds to the external diameter $D_A$ of the outer wall 113 of the extension 110. Due to the missing flat sections at the extension 110, the extension 110 of this exemplary embodiment cannot be introduced into the support 200 either and the operator realizes that he has to remove the extension 110 with the seal 114 arranged therein from the line-fastening device 100 to be able to then arrange it in the support 200 without extension 110. FIGS. 18 to 25 show a hydraulic line connection device and hydraulic component-fastening device according to an exemplary embodiment. The hydraulic line connection device and hydraulic component-fastening device comprises a hydraulic line connector 10, to which a hydraulic line 1 is fastened, as well as a hydraulic connector 20 and a hydraulic component fastener 30.

The hydraulic line connector 10 is arranged inside a handlebar pipe 3, on which a handle pipe 4 can be provided. The hydraulic line connector 10 has a hydraulic line connection 11, which is connected to the hydraulic connector 20 via a connecting channel 12.

The hydraulic component fastener 30 is arranged on the outside of the handlebar pipe. The master cylinder is attached to the hydraulic component fastener 30.

The hydraulic connector 20 connects the hydraulic component fastener 30 to the hydraulic line connector 10. For this purpose, the hydraulic connector 20 engages in the hydraulic line connector 10, extends through a recess 8 in the handlebar pipe 3 and engages at the hydraulic component fastener 30.

The recess 8 in the handlebar pipe 3 is designed as an oblong hole, such that the hydraulic component fastener 30 can be arranged at the handlebar pipe 3 in a desired setting via a distance that corresponds to the length of the oblong hole minus the dimensions (of the space required) of the hydraulic connector 20.

The hydraulic component fastener 30 comprises a ring support 34, which extends around the handlebar pipe 3. On the side interior with respect to the vehicle, recesses 31 are arranged, in which a safety, e.g., an anti-rotation mechanism 32, can engage to secure the hydraulic component 2 mounted on the hydraulic component fastener 30 in a desired rotational position.

The master cylinder has a pressure chamber 52, at the lower end of which, i.e., the end close to the handlebar pipe 3, a connecting channel 51 is provided, which is connected to the connecting channel 33 in the hydraulic component fastener 30. An equalizing tank 53 is provided on the side of the housing 5.

The connecting channel 33 extends over the entire circumference of the ring support 34, such that the hydraulic component 2 can be mounted in any rotational position, wherein a hydraulic connection is ensured between the connecting channel 51 and the connecting channel 33.

The hydraulic connector 20 comprises a bolt 22, in which a connecting channel 21 is provided. The connecting channel 21 is connected to the connecting channel 33 and a connecting channel 12 in the hydraulic line connector 10.

The head of the bolt 22 is sealed against the hydraulic component fastener 30 by a seal 23, and the lower end of the bolt 22 is sealed against the hydraulic line connector 10 by a seal 24.

The connecting channel 33 is sealed on its both sides by seals 35, 36, which are arranged in grooves that are formed on the surface of the hydraulic component fastener 30.

The hydraulic component 2 has a master housing 5, which is arranged on the hydraulic component fastener 30 by a fastening portion 54, namely by a press fit, so as to allow, on the one hand, rotation about the handlebar and, on the other hand, sealing between the fastening portion 54 and the hydraulic component fastener 30 enclosed by the fastening portion via the seals 35, 36.

Furthermore, a fastening arrangement 40 is provided, by which the axial position of the hydraulic component 2 can be secured on the handlebar. The fastening arrangement 40 comprises a bolt 41, which extends through a conical ring 43 and engages in the hydraulic line connector 10. The hydraulic line connector 10 comprises, on the side in which the bolt 41 engages, a conical surface 44 that corresponds to the conical surface of the conical ring 43. A conical ring 42 is arranged on these conical surfaces. By screwing the bolt 41 into the thread of the hydraulic line connector 10, the conical ring 42 is braced radially outwards, such that the hydraulic line connector 10 is axially fixed in position by the frictional engagement.

For the purpose of assembly, the hydraulic line connector 10 is first connected to the hydraulic line 1 and introduced into the handlebar pipe 3. Then, the hydraulic component fastener 30 is arranged on the outer side of the handlebar pipe 3 and fixed in a desired position by the hydraulic connector 20 by inserting it through the recess 8 in the handlebar pipe 3 and screwing it into the hydraulic line connector 10. The fastening arrangement 40 is tightened before or after this event. Thereafter, the hydraulic component 2 is arranged on the hydraulic component fastener 30 and turned in the desired position. Finally, the rotational position is secured by the anti-rotation mechanism 32 by tightening this mechanism.

Figure 26:
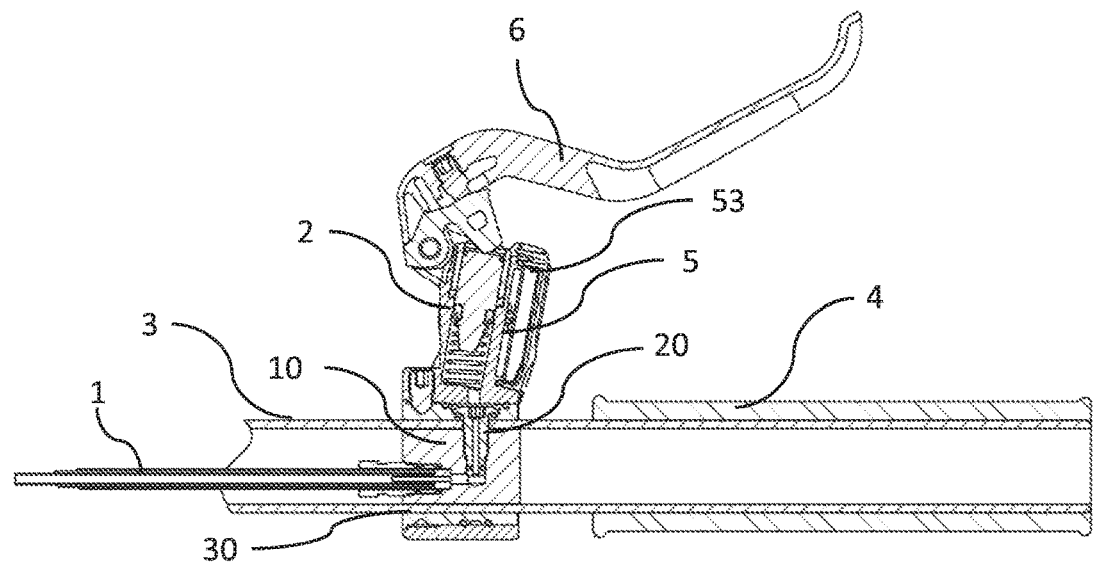
FIG. 26 shows a cross-sectional view of an exemplary embodiment of a hydraulic line connection device and hydraulic component-fastening device.
Figure 27:
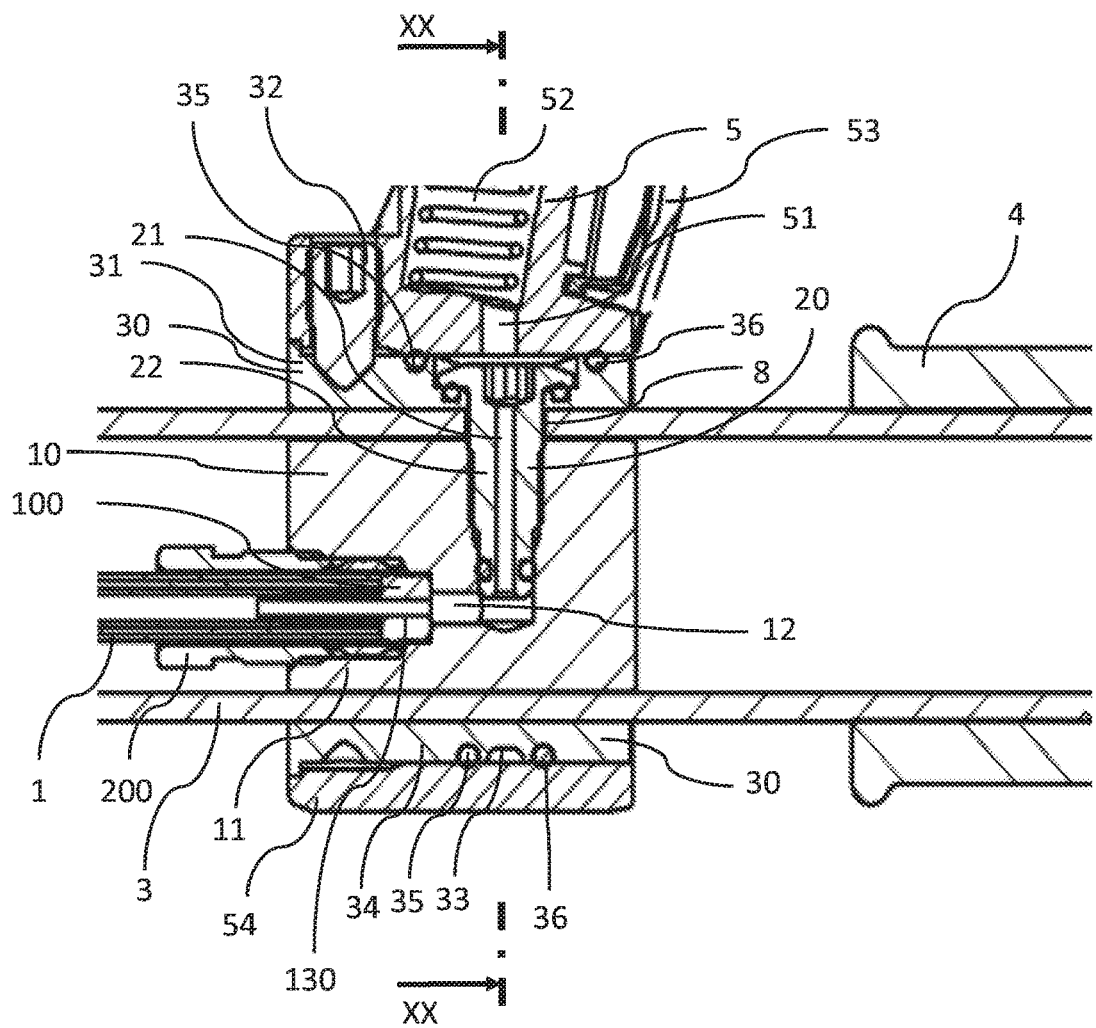
FIG. 27 shows a detailed cross-sectional view of the hydraulic line connection device and hydraulic component-fastening device of FIG. 26.

FIGS. 26 and 27 show a further exemplary embodiment, which corresponds substantially to the exemplary embodiments shown in FIGS. 18 to 25 and described in connection therewith. Therefore, only the differences with respect to the embodiments shown and described therein are described below and shown in FIGS. 26 and 27. Apart from that, reference is made to the description and the drawings of the other embodiments, wherein the same reference signs designate the same or corresponding components or features.

In the embodiment shown in FIGS. 26 to 27, the recess is designed as a hole, the dimensions of which correspond to the dimensions of the hydraulic connector 20. Therefore, the hydraulic component fastener 30 can only be fastened to the handlebar pipe at a certain suitable position. However, in this embodiment, the fastening arrangement 40, as shown, can be omitted because the axial securement is effected by the hydraulic connector 20 that is arranged in the recess 8 and that prevents a displacement of the hydraulic component 2 in the axial direction. As a result, this embodiment can be formed more easily.

Figure 28:
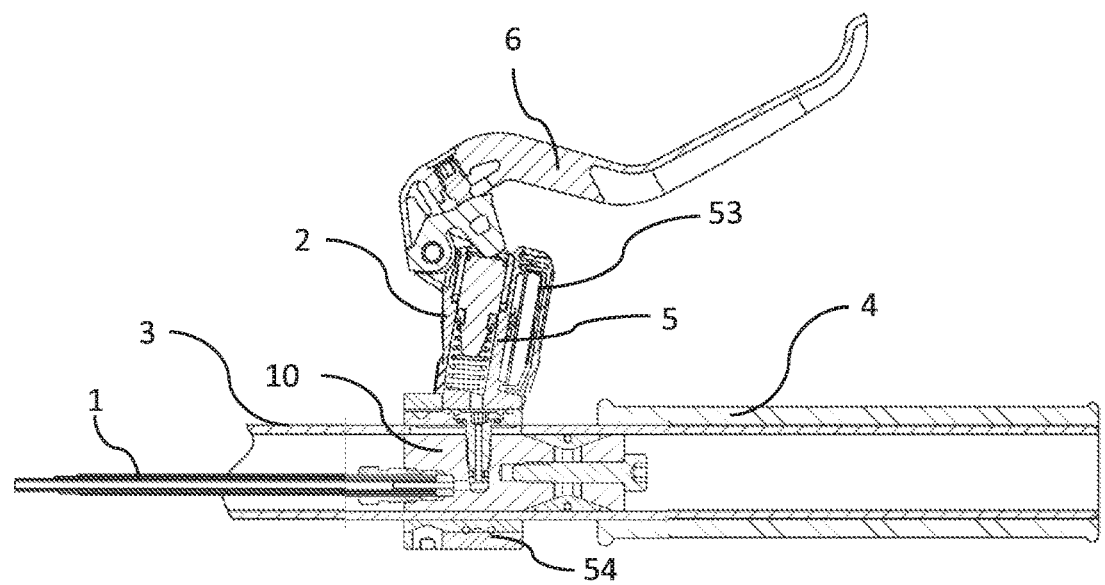
FIG. 28 shows a cross-sectional view of an exemplary embodiment of a hydraulic line connection device and hydraulic component-fastening device.
Figure 29:
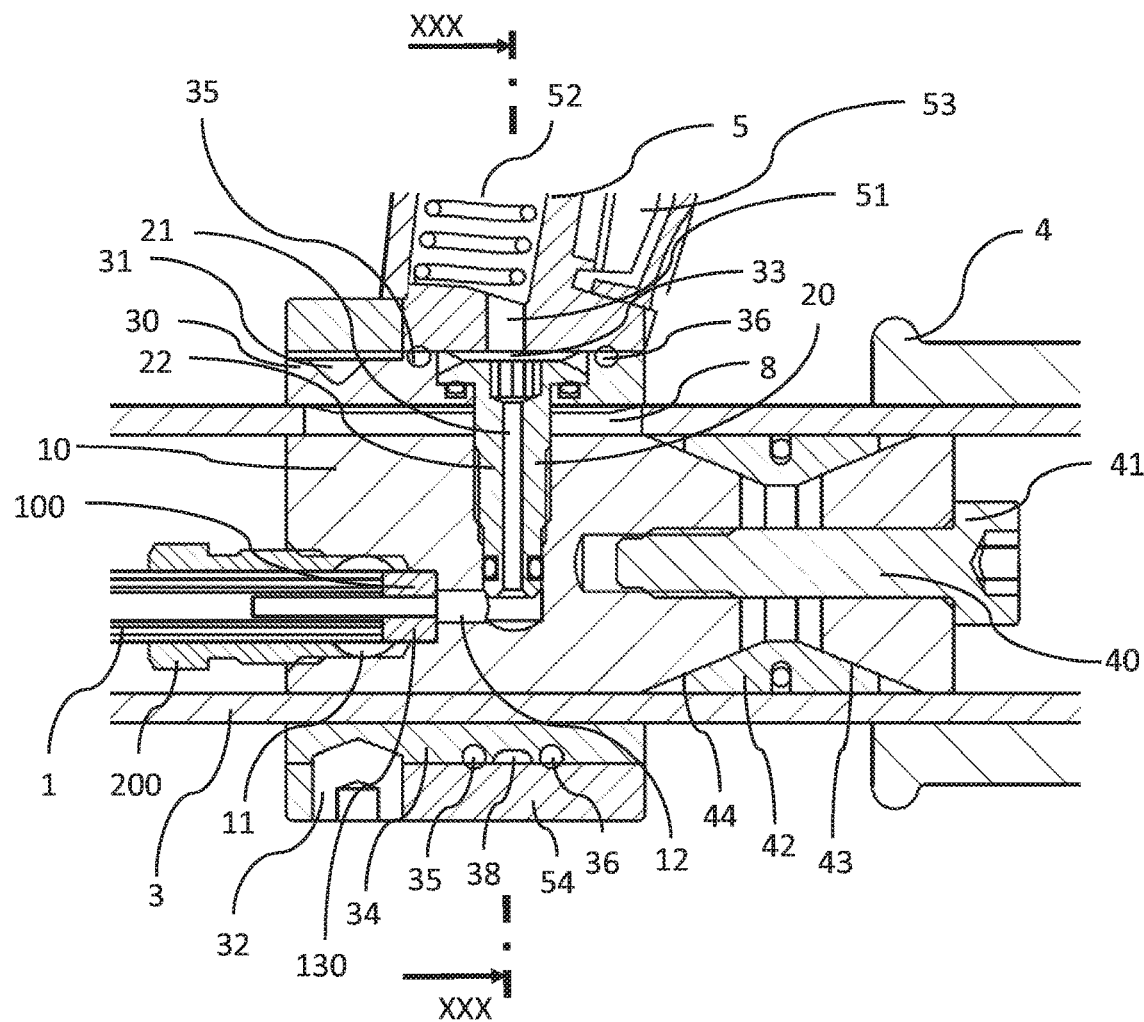
FIG. 29 shows a detailed cross-sectional view of the hydraulic line connection device and hydraulic component-fastening device of FIG. 28.
Figure 30:
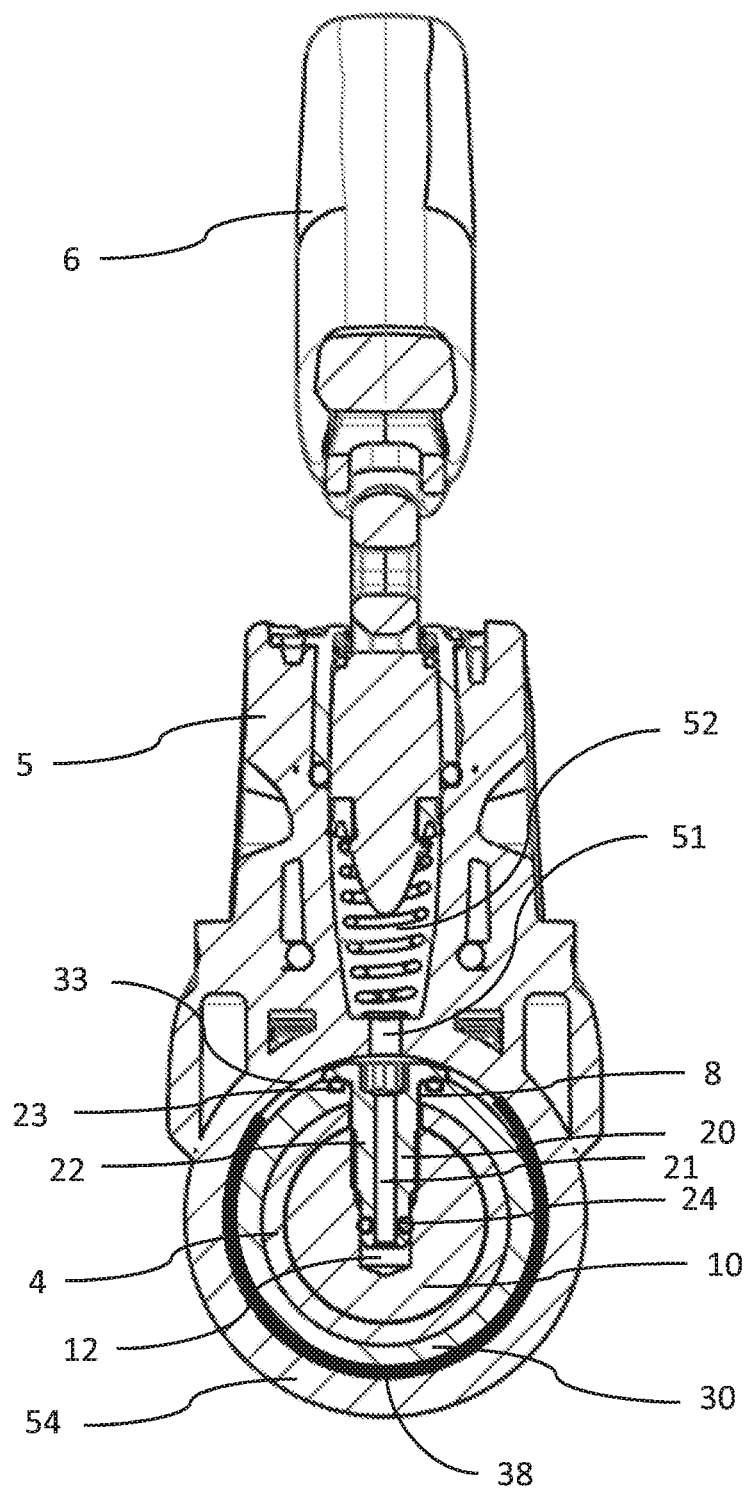
FIG. 30 shows a cross-sectional view of the hydraulic line connection device and hydraulic component-fastening device of FIG. 28 along the lines XXX-XXX of FIG. 29.

FIGS. 28 to 30 show a further exemplary embodiment, which corresponds substantially to the embodiments of the invention shown in FIGS. 18 to 25 or 26 and 27 and described in connection therewith. Therefore, only the differences with respect to the embodiments shown and described therein are described below and shown in FIGS. 28 to 30. Apart from that, reference is made to the description and the drawings of the other embodiments, wherein the same reference signs designate the same or corresponding components or features.

In the exemplary embodiment, which is shown in FIGS. 28 to 30, the anti-rotation mechanism 32 is arranged on the side of the hydraulic component fastener 30 that is opposite to the pressure chamber 52. Furthermore, a seal 38 is arranged in a region of the connecting channel 33, which extends over about 270° of the circumference. The advantage of this embodiment is that the sealing effect is enhanced when the anti-rotation mechanism 32 is tightened again after the setting of the desired rotational angle of the cylinder.

In this embodiment, the recess can be designed in accordance with the embodiment of FIGS. 26 to 27, and, therefore, the fastening arrangement 40 can be omitted.

Figure 31:
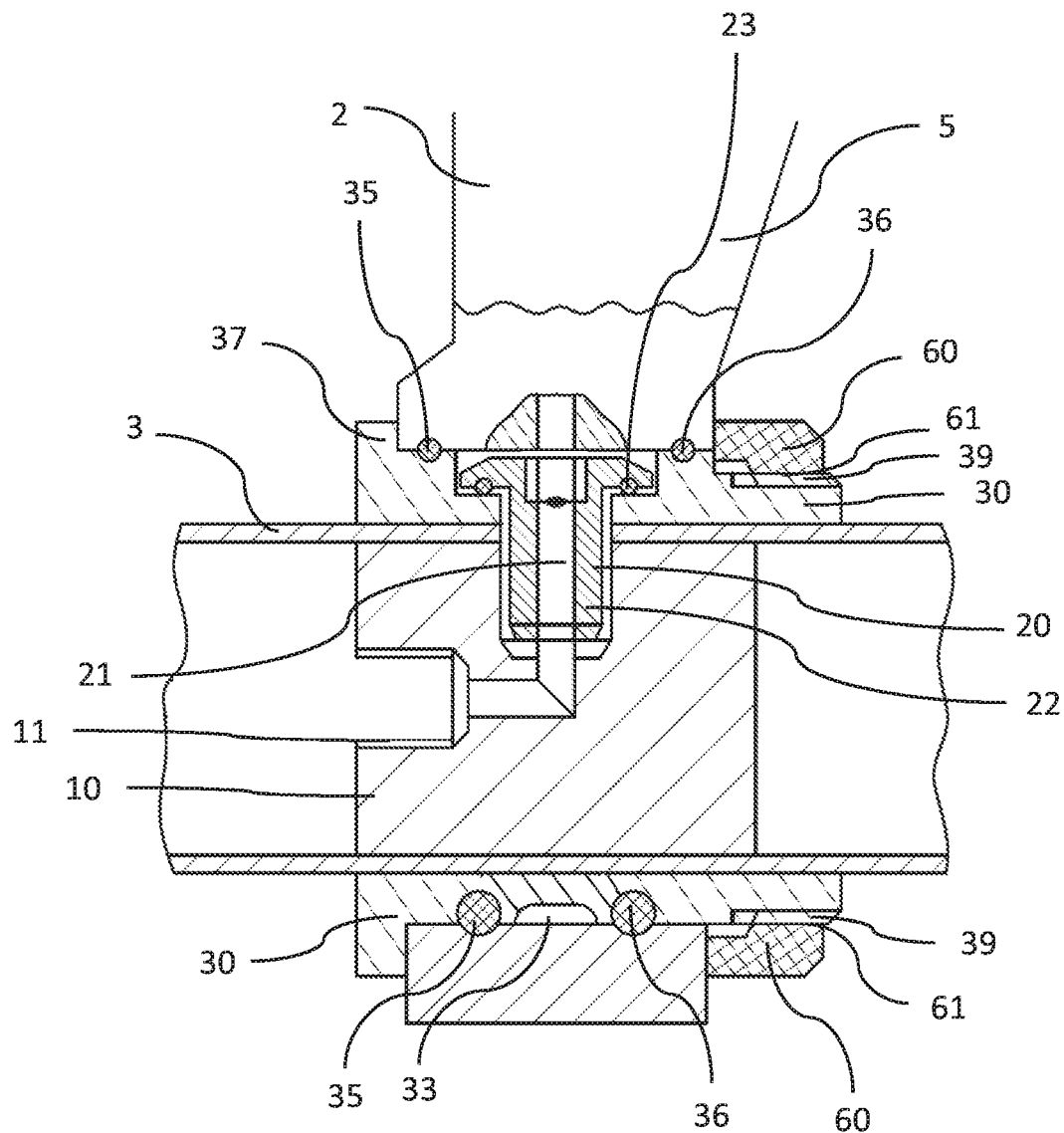
FIG. 31 shows a cross-sectional view of an exemplary embodiment of a hydraulic line connection device and hydraulic component-fastening device.

FIG. 31 shows a further exemplary embodiment, which corresponds substantially to the exemplary embodiments shown in FIGS. 18 to 25 or 26 and 27 or 28 to 30 and described in connection therewith. Therefore, only the differences with respect to the embodiments shown and described therein are described below and shown in FIG. 31. Apart from that, reference is made to the description and the drawings of the other embodiments, wherein the same reference signs designate the same or corresponding components or features.

In this embodiment, the hydraulic component 2 is pushed onto the hydraulic component fastener 30 until it laterally touches a stop 37. On the side opposite to the stop 37, a clamp ring 60 with an internal thread 61 is then screwed onto an external thread 39 formed on the hydraulic component fastener 30 so as to brace the hydraulic component 2 between the stop 37 and the clamp ring 60.

Figure 32:
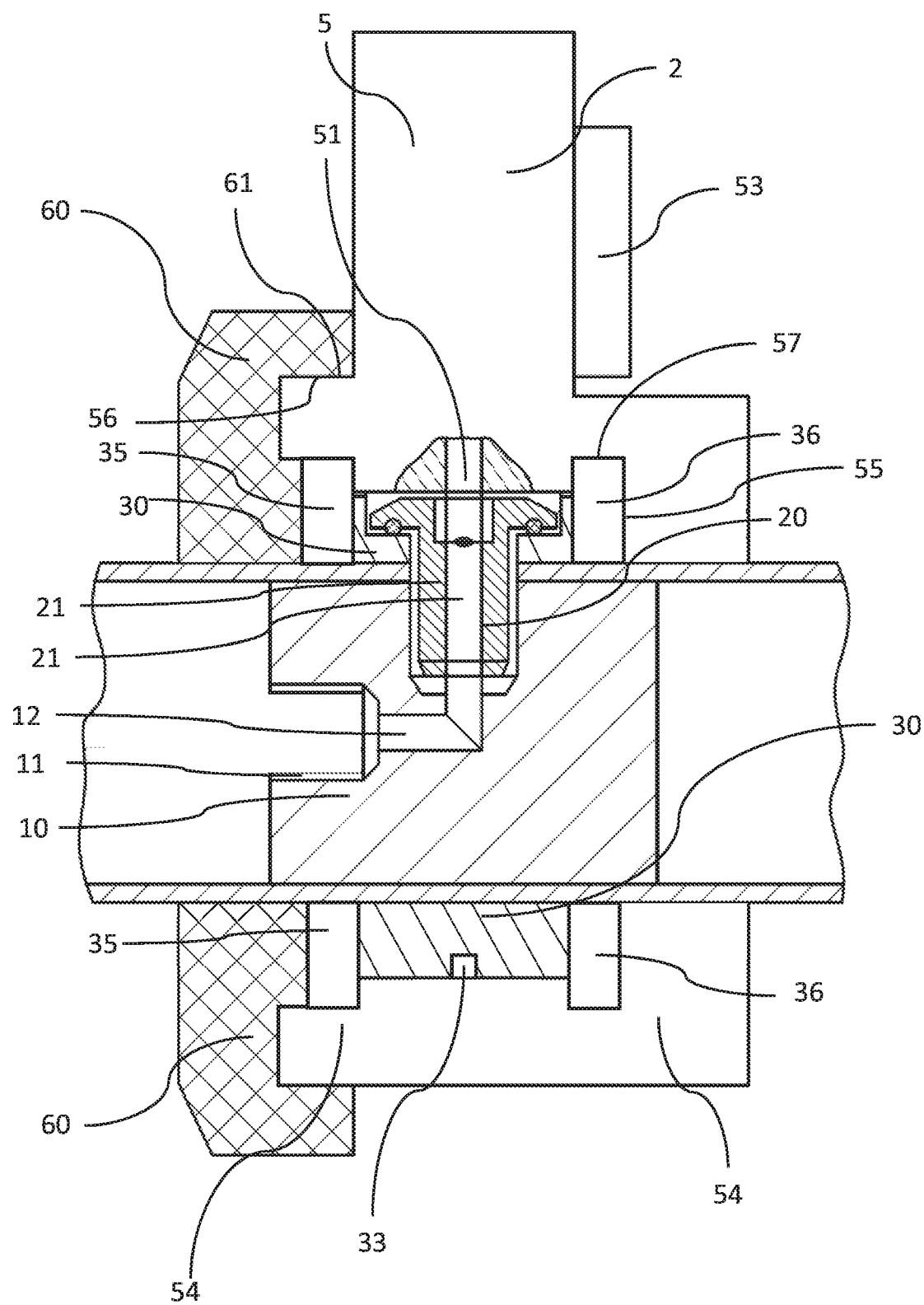
FIG. 32 shows a cross-sectional view of an exemplary embodiment of a hydraulic line connection device and hydraulic component-fastening device.

FIG. 32 shows a further exemplary embodiment, which corresponds substantially to the exemplary embodiments shown in FIGS. 18 to 25 or 26 and 27 or 28 to 30 or 31 and described in connection therewith. Therefore, only the differences with respect to the embodiments shown and described therein are described below and shown in FIG. 32. Apart from that, reference is made to the description and the drawings of the other embodiments, wherein the same reference signs designate the same or corresponding components or features.

In this embodiment, the seals 35 and 36 are made as squeezing seals that are arranged on both sides of the hydraulic component fastener 30. On the right-hand side, the housing 5 has a stop 55, which presses against the right-hand seal 36, which can be received in an optional groove 57, which is formed in the housing 5. On the left-hand side, the housing 5 has an external thread 56 on which a clamp ring 60 can be screwed by an internal thread 61, the clamp ring 60 pressing the left-hand seal 35 against the housing 5 and the hydraulic component fastener 30. When the clamp ring 60 is tightened, the seals 35, 36 are squeezed and expand radially outwards so as to achieve sufficient sealing for the operation of the hydraulic component 2.

For the assembly, the clamp ring 60 with the seal 35 is initially pushed onto the handlebar pipe 3. Then, the hydraulic component fastener 30 is mounted on the handlebar pipe 3. Thereafter, the hydraulic component 2 with the seal 36 is pushed onto the handlebar pipe 3 and arranged on the hydraulic component fastener 30. Then, the clamp ring 60 can be tightened after the desired rotational position was set.

Figure 19:
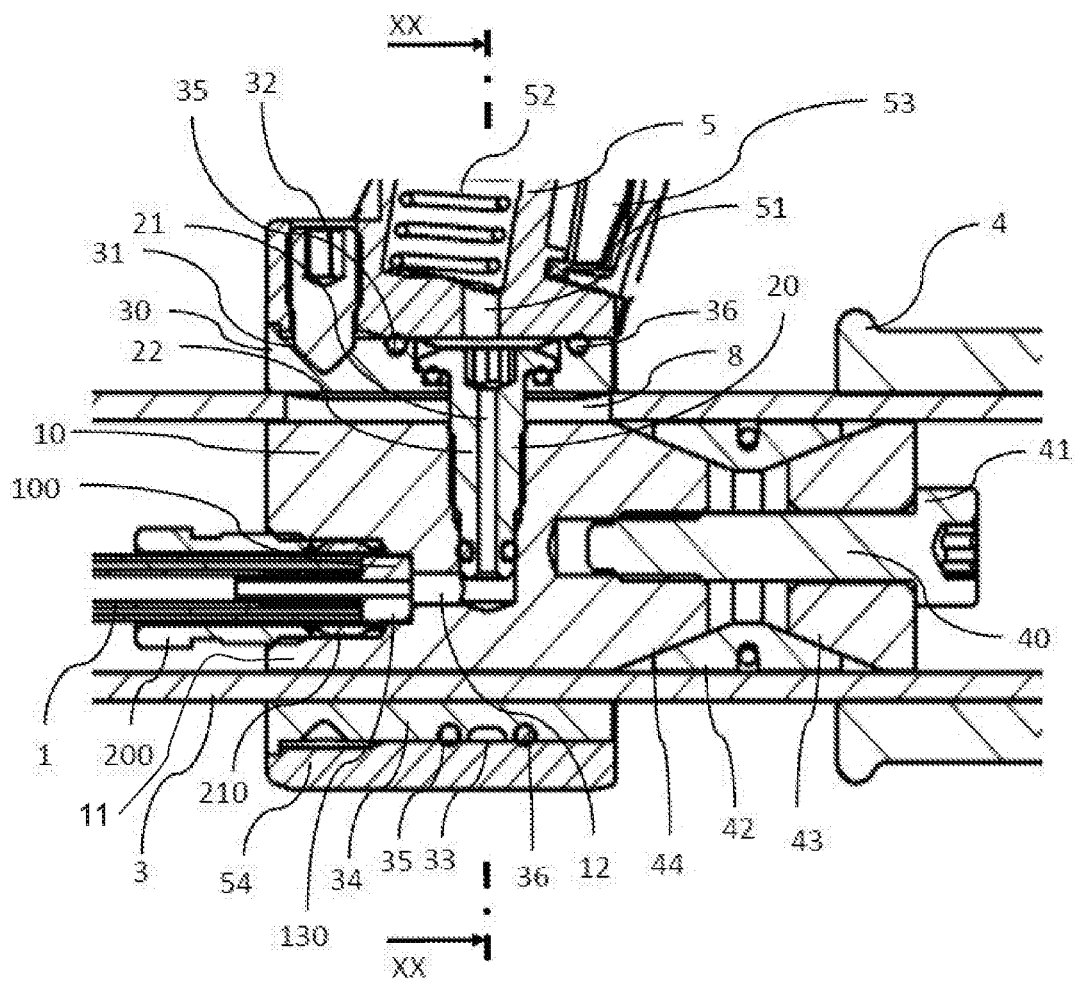
FIG. 19 shows a detailed view of the hydraulic line connection device and hydraulic component fastening device of FIG. 18.
Figure 20:
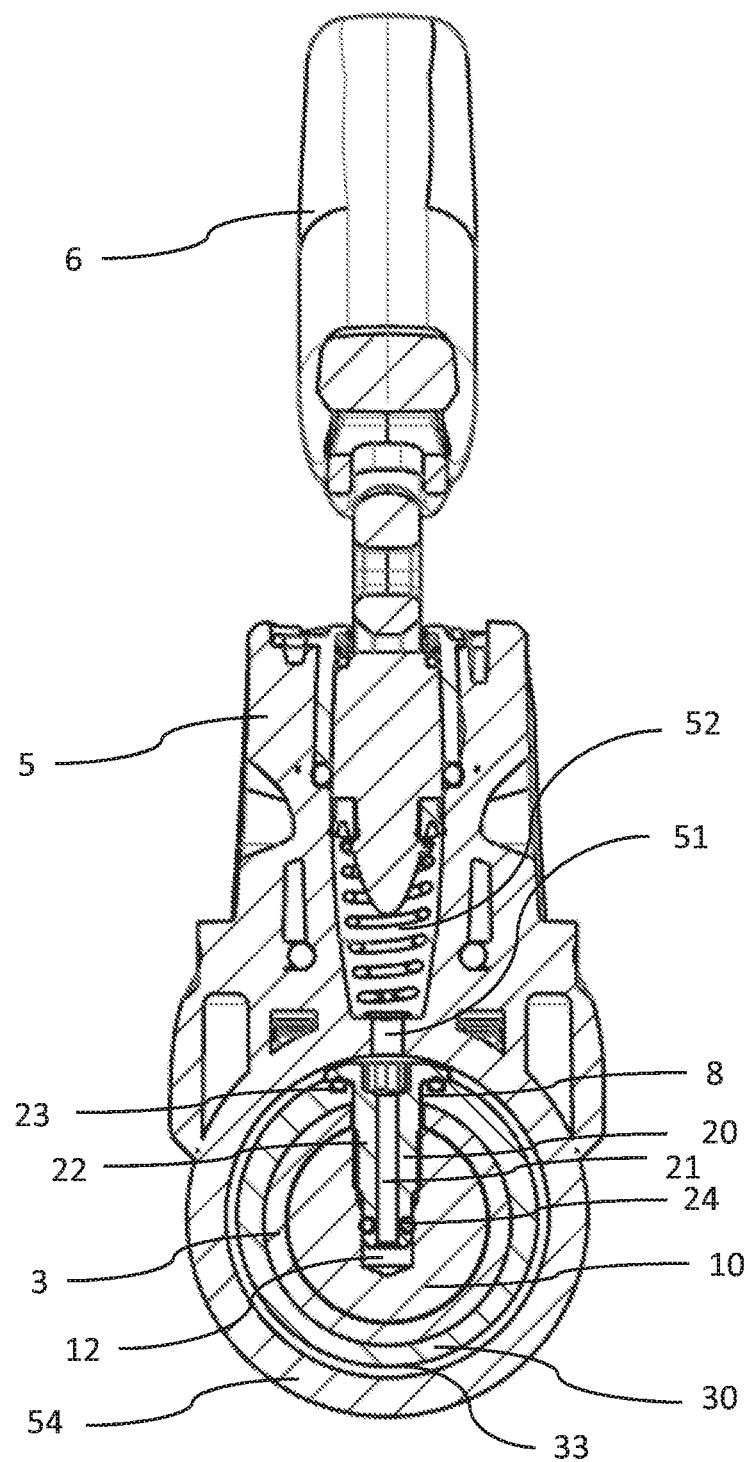
FIG. 20 shows a cross-sectional view of the hydraulic line connection device and hydraulic component fastening device of FIG. 18 along lines XX-XX of FIG. 19.
Figure 21:
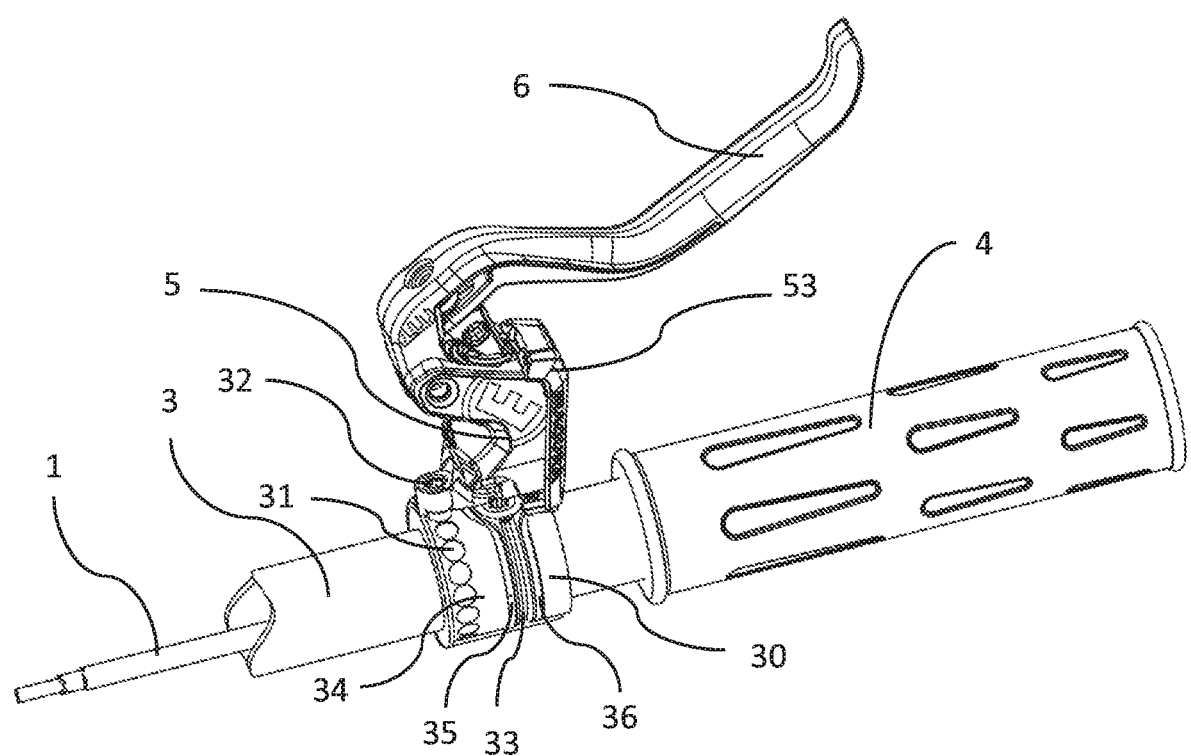
FIG. 21 shows a perspective partially cut away view of the hydraulic line connection device and hydraulic component-fastening device of FIG. 18 at an angle from above.
Figure 22:
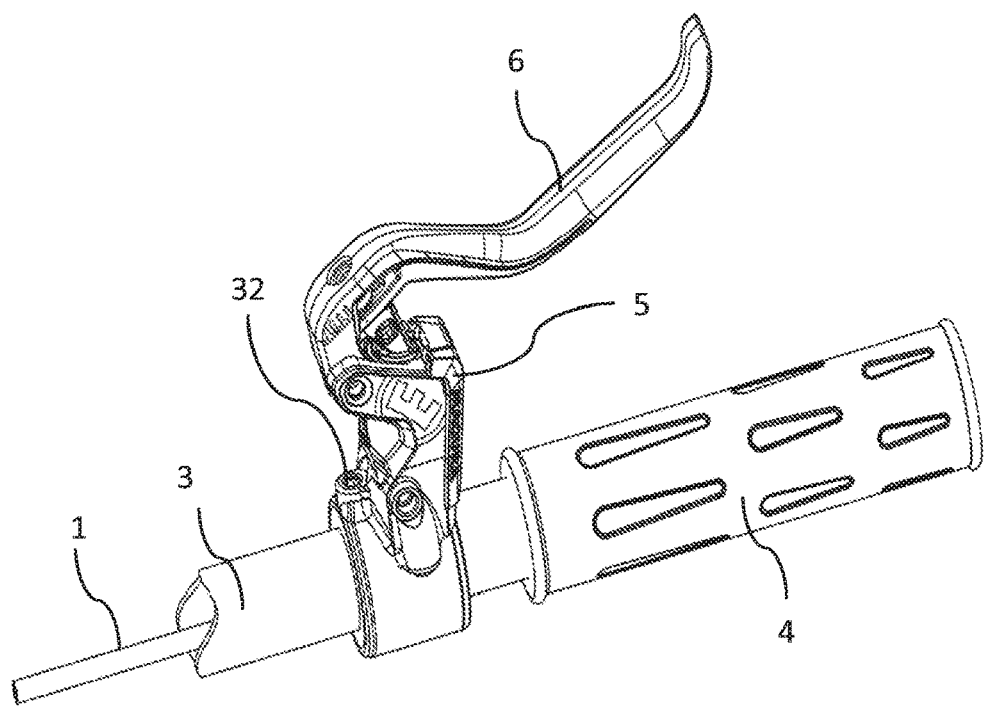
FIG. 22 shows a perspective view of the hydraulic line connection device and hydraulic component-fastening device of FIG. 18 at an angle from above.
Figure 23:
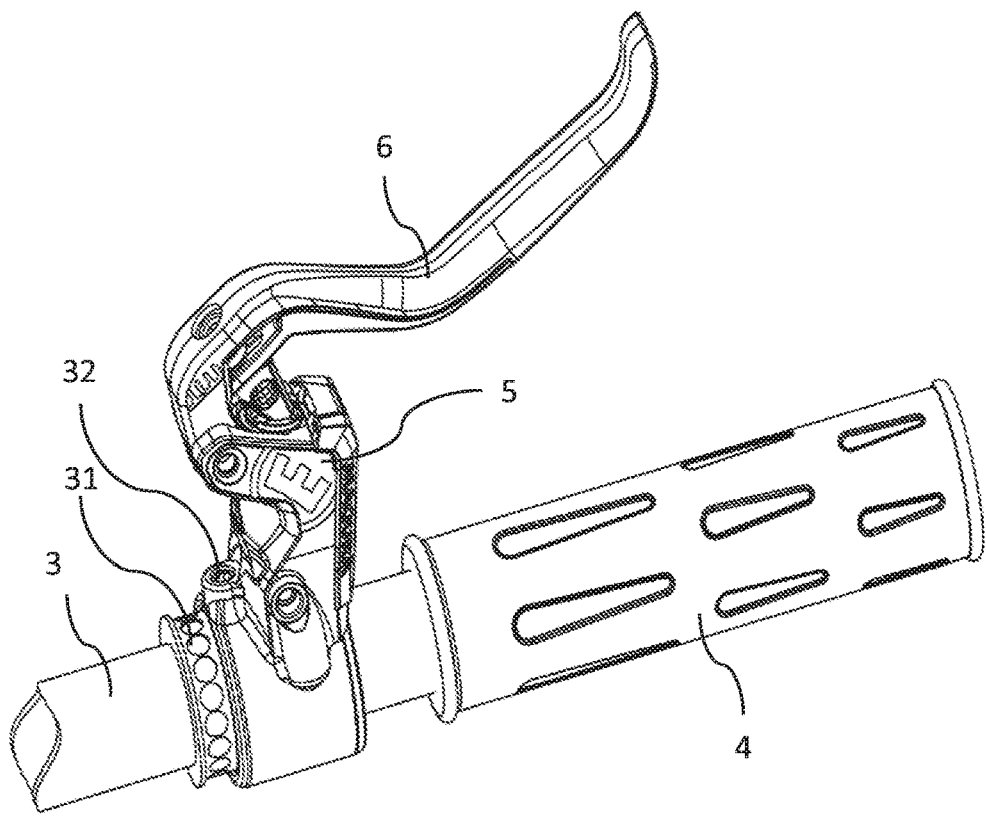
FIG. 23 shows a view, corresponding to FIG. 22, of the hydraulic line connection device and hydraulic component-fastening device of FIG. 18 during assembly.
Figure 24:
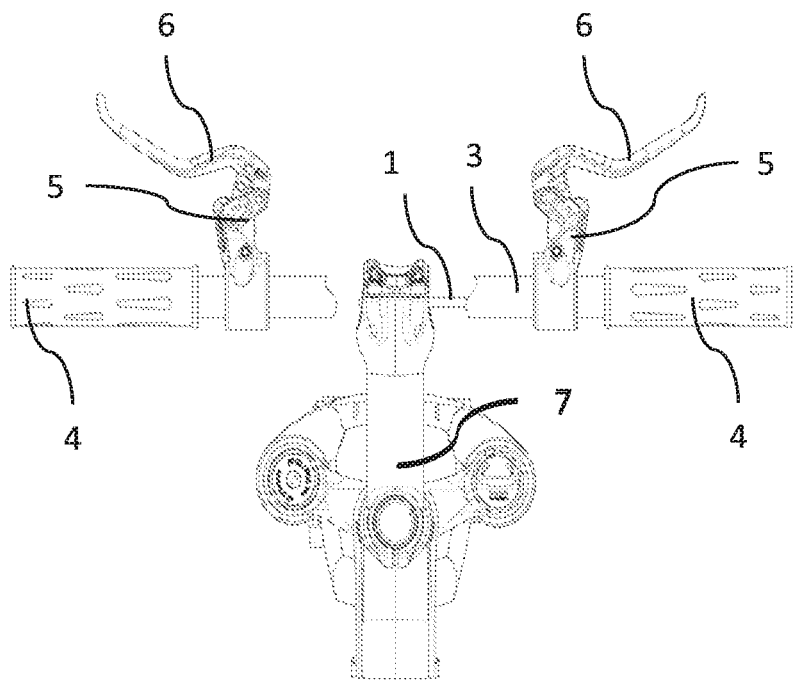
FIG. 24 shows a view of the hydraulic line connection device and hydraulic component fastening device of FIG. 18 from above.
Figure 25:
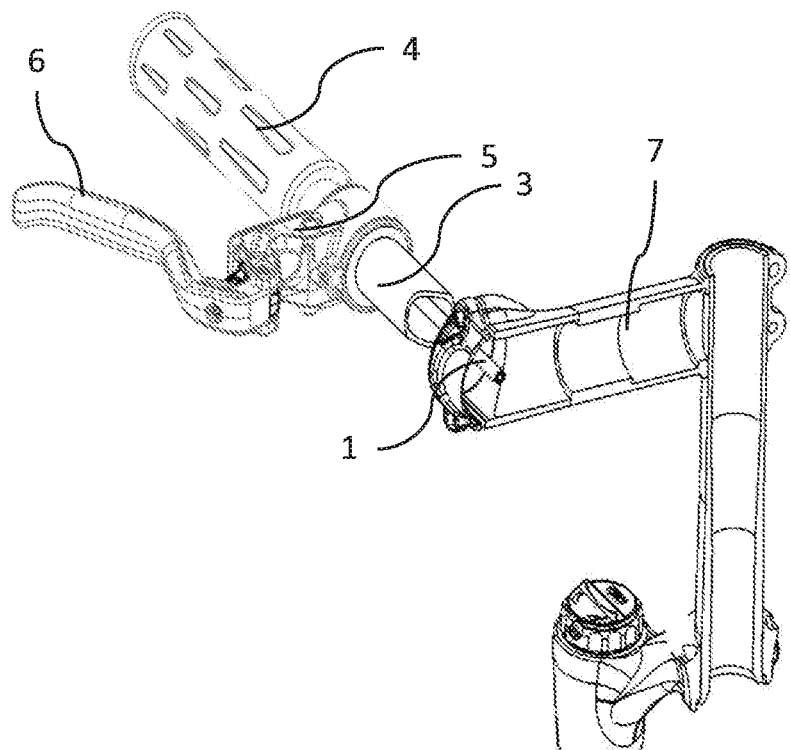
FIG. 25 shows a perspective partial view of the hydraulic line connection device and hydraulic component-fastening device of FIG. 18 at an angle from the side, top and front.

The embodiments of FIGS. 31 and 32 show the hydraulic line connector 10 and the hydraulic line connection 11, in which the line-fastening device 100, as shown, e.g., in FIG. 19 or FIG. 29, can be arranged for connection to the hydraulic line 1.

Of course, the invention is not limited to the illustrated embodiments. Therefore, the above description should not be considered limiting but explanatory. The below claims should be understood in such a way that a described feature is available in at least one exemplary embodiment. This does not rule out the presence of further features. If the claims and the above description define "first" and "second" embodiments, this designation serves to distinguish between two similar embodiments without determining an order.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. A hydraulic line connection for a hydraulic brake of vehicles with handlebar steering, comprising:
   a line-fastening device, which has a fastening portion for fastening the line-fastening device in a support of a hydraulic component of the hydraulic brake and a connecting portion for connection with a hydraulic line, the fastening portion having a given diameter, and
   wherein the line-fastening device comprises:
      an extension, which is attached to the fastening portion on the side opposite to the connecting portion, the extension having a diameter larger than that of the given diameter, the extension and the fastening portion being two portions of a single part; and
      a separator disposed between the fastening portion and the extension.

2. The hydraulic line connection according to claim 1, further comprising a seal arranged in the extension.

3. The hydraulic line connection according to claim 1, wherein the extension has a cross-section different from that of the fastening portion.

4. The hydraulic line connection according to claim 1, wherein the extension has a diameter that is larger than that of the fastening portion by one of:
- about at least 5%;
- about at least 10%;
- about at least 15%; and
- about 20%.

5. The hydraulic line connection according to claim 1, wherein the extension has a diameter that is larger than that of the fastening portion by one of:
- less than 50%;
- less than 40%;
- less than 30%; and
- about 20%.

6. The hydraulic line connection according to claim 1, wherein at least one of:
- the extension has a cross-section that is larger than that of the fastening portion by one of:
  - at least 10%;
  - at least 20%;
  - at least 30%; and
  - at least 40%; and
- the extension has a cross-section larger than that of the fastening portion by one of:
  - less than 100%:
  - less than 80%;
  - less than 70%;
  - less than 60%; and
  - about 50%.

7. A handlebar arrangement for vehicles with handlebar steering, comprising a hydraulic line connection according to claim 1.

8. A hydraulic line connection device and hydraulic component-fastening device for a hydraulic actuation device of vehicles with handlebar steering, comprising:
- a hydraulic line connector, which can be arranged in a handlebar, a fork leg and/or a frame part of the vehicle with handlebar steering, the handlebar comprising a handlebar pipe;
- a hydraulic component fastener, which has a support for receiving the hydraulic component; and
- a hydraulic connector which connects the hydraulic line connector to the hydraulic component fastener,
wherein the support has a connecting channel which can be connected to the pressure chamber of the hydraulic component, the connecting channel extending in a circumferential direction in relation to the handlebar pipe.

9. The device according to claim 8, wherein the connecting channel is sealed via radially acting seals.

10. The device according to claim 8, wherein the connecting channel is sealed via axially acting seals.

11. A handlebar arrangement for vehicles with handlebar steering, comprising a hydraulic line connection device and hydraulic component fastening device for a hydraulic actuation device of vehicles with handlebar steering according to claim 8.

12. A hydraulic line connection device and hydraulic component-fastening device for a hydraulic actuation device of vehicles with handlebar steering, comprising:
- a hydraulic line connector, which can be arranged in a handlebar, a fork leg and/or a frame part of the vehicle with handlebar steering, the handlebar comprising a handlebar pipe;
- a hydraulic component fastener, which has a support for receiving the hydraulic component; and
- a hydraulic connector which connects the hydraulic line connector to the hydraulic component fastener,
wherein:
- the support has a connecting channel which can be connected to the pressure chamber of the hydraulic component; and
- the connecting channel extends in the circumferential direction in relation to the handlebar pipe over an angular range of one of:
  - more than 20 degrees;
  - more than 30 degrees;
  - more than 40 degrees; and
  - about 50 degrees.

13. A hydraulic line connection device and hydraulic component-fastening device for a hydraulic actuation device of vehicles with handlebar steering, comprising:
- a hydraulic line connector, which can be arranged in a handlebar, a fork leg and/or a frame part of the vehicle with handlebar steering, the handlebar comprising a handlebar pipe;
- a hydraulic component fastener, which has a support for receiving the hydraulic component; and
- a hydraulic connector which connects the hydraulic line connector to the hydraulic component fastener,
wherein:
- the support has a connecting channel which can be connected to the pressure chamber of the hydraulic component; and
- the connecting channel extends in the circumferential direction in relation to the handlebar pipe over an angular range of;
  - less than 180 degrees;
  - less than 150 degrees;
  - less than 120 degrees;
  - less than 90 degrees;
  - less than 70 degrees; and
  - about 50 degrees.

* * * * *